(12) United States Patent
Ohashi et al.

(10) Patent No.: US 8,399,136 B2
(45) Date of Patent: Mar. 19, 2013

(54) ELECTROLYTE SOLUTION FOR LITHIUM ION SECONDARY BATTERY, LITHIUM ION SECONDARY BATTERY, FLUOROALKANE DERIVATIVE AND GELLING AGENT

(75) Inventors: Asami Ohashi, Tokyo (JP); Yoshiyuki Ishii, Tokyo (JP); Hiroaki Okamoto, Yamaguchi (JP); Yuki Morita, Yamaguchi (JP)

(73) Assignees: Asahi Kasei E-Materials Corporation, Tokyo (JP); Yamaguchi University, Yamaguchi (JP)

( * ) Notice: Subject to any disclaimer, the term of this patent is extended or adjusted under 35 U.S.C. 154(b) by 0 days.

(21) Appl. No.: 13/205,096

(22) Filed: Aug. 8, 2011

(65) Prior Publication Data
US 2012/0009480 A1    Jan. 12, 2012

Related U.S. Application Data

(63) Continuation-in-part of application No. PCT/JP2010/052090, filed on Feb. 12, 2010.

(30) Foreign Application Priority Data

Feb. 18, 2009    (JP) ................................ 2009-035302

(51) Int. Cl.
*H01M 10/56* (2010.01)
*C07D 213/64* (2006.01)
(52) U.S. Cl. ......................................... 429/300; 568/33
(58) Field of Classification Search .................. 568/28, 568/33; 429/200, 300; 252/184; 546/302
See application file for complete search history.

(56) References Cited

U.S. PATENT DOCUMENTS

| 5,120,876 | A | 6/1992 | Cheng et al. |
| 5,795,677 | A | 8/1998 | Yamamoto et al. |
| 6,002,048 | A * | 12/1999 | Fujii et al. ..................... 568/579 |
| 2006/0286308 | A1 | 12/2006 | Kirsch et al. |
| 2009/0087740 | A1 | 4/2009 | Deguchi et al. |
| 2009/0090891 | A1 | 4/2009 | Okamoto et al. |
| 2012/0184779 | A1 | 7/2012 | Okamoto et al. |

FOREIGN PATENT DOCUMENTS

| EP | 2 221 295 A1 | 8/2010 |
| JP | 8-37024 | 2/1996 |

(Continued)

OTHER PUBLICATIONS

International Preliminary Report on Patentability for PCT/JP2010/052090, mailed Sep. 13, 2011.

(Continued)

*Primary Examiner* — Mark F Huff
*Assistant Examiner* — Monique Wills
(74) *Attorney, Agent, or Firm* — Greenblum & Bernstein, P.L.C.

(57) ABSTRACT

The electrolyte solution for a lithium ion secondary battery according to the present invention contains a nonaqueous solvent, a lithium salt and a compound represented by the general formula (Z) shown below. Thereby, a lithium ion secondary battery having high battery characteristics and simultaneously achieving a high safety as well can be provided.

$$R-SO_2-Ar^1-O-R^1 \quad (Z)$$

wherein $Ar^1$ denotes a substituted or nonsubstituted divalent aromatic group having 5 to 30 atoms of the nucleus(es); $R^1$ denotes a saturated or unsaturated monovalent hydrocarbon group having 1 to 20 carbon atoms; and R denotes a saturated or unsaturated monovalent hydrocarbon group having a perfluoroalkyl group and having 2 to 22 carbon atoms.

22 Claims, 1 Drawing Sheet

FOREIGN PATENT DOCUMENTS

| | | |
|---|---|---|
| JP | 8-231942 A | 9/1996 |
| JP | 8-321313 | 12/1996 |
| JP | 9-97627 | 4/1997 |
| JP | 11-26015 | 1/1999 |
| JP | 2000-294281 | 10/2000 |
| JP | 2001-52737 | 2/2001 |
| JP | 2002-324578 | 11/2002 |
| JP | 2003-323814 A | 11/2003 |
| JP | 2007-191626 A | 8/2007 |
| JP | 2007-191627 A | 8/2007 |
| JP | 2007-191661 A | 8/2007 |
| JP | 2007-323827 | 12/2007 |
| JP | 2008-159496 | 7/2008 |
| JP | 2008-218387 | 9/2008 |
| JP | 2008-273893 | 11/2008 |
| JP | 2008-305574 | 12/2008 |
| JP | 2009-87648 | 4/2009 |
| JP | 2010-280799 A | 12/2010 |
| JP | 2010-282728 A | 12/2010 |
| WO | 91/08198 A1 | 6/1991 |
| WO | 95/27692 A1 | 10/1995 |
| WO | 2005/019378 A1 | 3/2005 |
| WO | 2007/007636 | 1/2007 |
| WO | 2007/083843 A1 | 7/2007 |
| WO | 2009/078268 A1 | 6/2009 |
| WO | 2010/095572 A1 | 8/2010 |
| WO | 2010/143658 A1 | 12/2010 |
| WO | 2011/099572 | 8/2011 |

OTHER PUBLICATIONS

U.S. Appl. No. 13/376,886, filed Dec. 8, 2011.
Extended Abstracts of the 49th Battery Symposium in Japan, 2008, pp. 258-260.
Search report from International Application No. PCT/JP2010/059765, mail date is Aug. 24, 2010.
International Preliminary Report on Patentability and Written Opinion for International Application No. PCT/JP2010/059765, mail date is Jan. 26, 2012.
Napoli et al., "Synthesis of F(CF2)8(CH2)8H and Gel Phase Formation from its Solutions in Homologous Alcohols", Journal of Fluorine Chemistry, vol. 110, (2001). Elsevier Science, Apr. 28, 2001, pp. 47-58.
"Function Creation and Applications of Ionic Liquid", NTS, Inc. (2004).
"Separation/Recovery and Storage/Isolation Technologies of CO2", NTS, Inc. (2009).
Miller et al., "Substituted Azole Derivatives as Nonlinear Optical Chromophores", Chem. Mater, vol. 6, No. 7, (1994). IBM Research Division, Almaden Research Center, San Jose California., Apr. 25, 1994, pp. 1023-1082.
Kazunori Hirabayashi et al., "A New Transformation of Silanols, Palladium-Catalyzed Cross-Coupling with Organic Halides in the Presence of Silver(I) Oxide.", Organic Letters, vol. 1, No. 2, (1999). Research Laboratory of Resources Utilization, Tokyo Institute of Technology., Apr. 22, 1999, pp. 299-301.
Search report from International Applicaiton No. PCT/JP2010/052090, mail date is May 18, 2010.
Search report from International Applicaiton No. PCT/JP2011/052908, mail date is Apr. 5, 2011.
Miller et al., "Substituted Azole Derivatives as Nonlinear Optical Chromophores", Chem. Mater, vol. 6, No. 7, (1994). IBM Research Division, Almaden Research Center, San Jose California., Apr. 25, 1994, pp. 1023-1032.

* cited by examiner

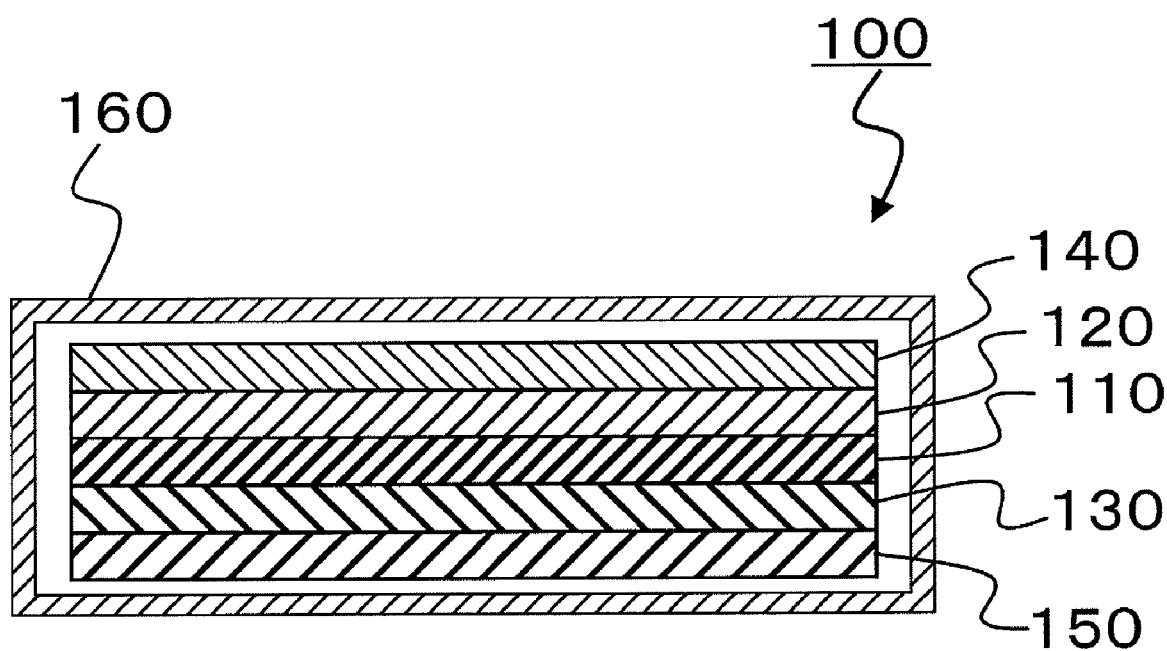

ELECTROLYTE SOLUTION FOR LITHIUM ION SECONDARY BATTERY, LITHIUM ION SECONDARY BATTERY, FLUOROALKANE DERIVATIVE AND GELLING AGENT

CROSS-REFERENCE TO RELATED APPLICATIONS

The present application is a continuation-in-part International Application PCT/JP2010/052090, which was filed on Feb. 12, 2010 claiming priority from Japanese Patent Application No. 2009-035302 filed on Feb. 18, 2009 in Japan. The entire disclosure of International Application No. PCT/JP2010/052090 is incorporated by reference in this application.

TECHNICAL FIELD

The present invention relates to an electrolyte solution for a lithium ion secondary battery, a lithium ion secondary battery, a fluoroalkane derivative, a gelling agent and a gelatinous composition, and an electrode for an electrochemical device, an electrolyte solution for a dye-sensitized solar battery and a carbon dioxide-absorbing composition.

BACKGROUND ART

Gelling agents are conventionally used for the purposes of solidifying liquid substances, that is, gelatinously solidifying them, or increasing their viscosities, in various types of industrial fields (for example, coating, cosmetic, pharmaceutical and medical, spilled petroleum-treating, electronic and optical, and environmental fields).

These gelling agents include ones to gelatinize (solidify) water, and gelatinize (solidify) nonaqueous solvents, and solutions containing mainly the nonaqueous solvent, and the like. The structures of the gelling agents may be roughly classified into a high-molecular weight type and a low-molecular weight type. The high-molecular weight type gelling agents are used mainly for gelatinizing nonaqueous solvents, and have a feature that while a high-molecular weight polymer having lipophilicity takes oils in entangled molecules thereof and is swelled with the oils, the swelled polymer holds a solid state. By contrast, many of low-molecular weight type gelling agents contain hydrogen bonding functional groups (for example, an amino group, an amido group and a urethane group) in molecules thereof, and have a feature that water and nonaqueous solvents are gelatinized through hydrogen bonds (see, for example, Patent Literature 1). Low-molecular weight type gelling agents are common as gelling agents of water, but the development as gelling agents of nonaqueous solvents is relatively slow.

Additionally, although low-molecular weight type gelling agents having no hydrogen bonding groups are disclosed, for example, in Patent Literature 4 and Non Patent Literature 1, examples thereof are very few.

Further, Low molecular weight or high molecular weight organic gelling agents are used to solidify organic liquids. As described above, known low molecular weight gelling agents include a low molecular weight compound group which has a hydrogen-bondable functional group, such as an amino group, an amido group and a urea group, in their molecule. The low molecular weight gelling agents are suitable for use in the fields such as cosmetics, perfumery and sludge treatments.

On the other hand, polymeric gelling agents refer to a polymeric compound group having a three-dimensional network structure in their molecule. Well-known polymeric gelling agents include polyetheric compounds.

Many studies have been made on polymeric gelling agents, which have been applied in various fields.

As low molecular weight organic gelling agents are developed relatively later than high molecular weight ones, few types of the low molecular weight organic gelling agents are known. Known low molecular weight organic gelling agents include a dialkylurea derivative (Patent Literature 1) and perfluoroalkyl derivatives (Patent Literatures 2 and 3, and Non Patent Literature 1).

CITATION LIST

Patent Literature

Patent Literature 1: Japanese Patent Laid-Open No. 8-231942
Patent Literature 2: Japanese Patent Laid-Open No. 2007-191626
Patent Literature 3: Japanese Patent Laid-Open No. 2007-191661
Patent Literature 4: International Publication No. WO 2009/78268

Non Patent Literature

Non Patent Literature 1: J. Fluorine Chem. 110, p 47-58 (2001)

SUMMARY OF INVENTION

Technical Problem

A conventional gelling agent to gelatinize a nonaqueous solvent generally needs to be used in a large amount, for example, in about 10% to a solution, and additionally has a tendency of transiting to a sol and returning to a liquid state at a relatively low temperature, for example, at about 30 to 40° C. Use of a large amount of a gelling agent to gelatinize a solvent (water or a nonaqueous solvent) is not only economically disadvantageous, but also means that the mixing amount of foreign matters into a solvent to be gelatinized becomes large; and in some cases of utilizing a gelatinized solvent, the influence of a gelling agent as an impurity cannot be disregarded. If the upper limit of the gelling temperature is low, due to a small rise in temperature, the solvent cannot hold the shape, and may be fluidized and causes liquid leakage and the like in some cases. Then, the development of a gelling agent which can hold a gelling state in a smaller amount of the gelling agent and up to a relatively high temperature is demanded.

Gelling agents, which can gelatinize nonaqueous solvents and systems in which strong hydrogen bonds cannot be present, are broadly demanded due to weak hydrogen bondability of the gelling agents.

However, conventional gelling agents have various types of problems, such as that can gelatinize few types of solvents, and have a drawback in stability of gels; and gelatinization of nonaqueous solvents needs a relatively large amount of a gelling agent.

Then, the present invention has been achieved in consideration of the above-mentioned situations, and has one object to provide a novel fluoroalkane derivative capable of gelatinizing or solidifying various types of nonaqueous solvents in a small amount of the addition, a gelling agent comprising the compound and a gelatinous composition comprising the gelling agent, and an electrode, an electrolyte solution for a dye-sensitized solar battery and a carbon dioxide-absorbing composition comprising the novel fluoroalkane derivative.

Lithium ion secondary batteries are at present used mainly as rechargeable batteries of portable devices. However, organic solvent-based electrolyte solutions are used for the lithium ion secondary batteries, and the further improvement of their safety is a large technical problem. Particularly in automobile applications whose evolutions are expected in the near future, higher battery safety (non-leakage, flame retardancy, dendrite suppression and the like) more than ever is demanded. Therefor, for example, polymer (gel) batteries and batteries using an ionic liquid or a fluoro solvent as an electrolyte solution are being developed. However, it is the actual situation at present that the safety and the battery characteristics have a tradeoff relation, and it is difficult to simultaneously satisfy both the safety and the battery characteristics (charge/discharge characteristics, low-temperature operability, high-temperature durability and the like). For example, polymer (gel) batteries are expected also from the viewpoint of downsizing batteries and increasing the form versatility in addition to the battery safety, but existing dry polymer batteries cannot be said to exhibit high battery characteristics (particularly low-temperature operability). Gel polymer batteries are deemed to have a more improving effect of battery characteristics (particularly rate characteristics and low-temperature operability) than dry polymer batteries, but are inferior to liquid electrolyte batteries.

On the other hand, there are now almost no study examples on batteries using low molecular weight organic gelling agents.

Therefore, the present invention has been achieved in consideration of the above-mentioned situations, and has one object to provide an electrolyte solution for a lithium ion secondary battery and a lithium ion secondary battery having high battery characteristics and simultaneously achieving high safety as well, and a novel gelling agent used therefor.

Solution to Problem

In order to achieve the above-mentioned object, the present inventors have studied the possibility of application of low molecular weight organic gelling agents, including ones described in Patent Literatures described above, to a lithium ion secondary battery. As a result, it has been found that a specific low molecular weight organic gelling agent can simultaneously contribute to both high battery characteristics and high safety, and this finding has led to the completion of the present invention. Studies on a gelling agent capable of gelatinizing or solidifying various types of nonaqueous solvents in a small amount of the addition have consequently led to the completion of the present invention.

That is, the present invention is as follows.

[1] An electrolyte solution for a lithium ion secondary battery, comprising a nonaqueous solvent, a lithium salt and a compound represented by the following general formula (Z):

wherein $Ar^1$ denotes a substituted or nonsubstituted divalent aromatic group having 5 to 30 atoms of the nucleus(es); $R^1$ denotes a saturated or unsaturated monovalent hydrocarbon group having 1 to 20 carbon atoms; and R denotes a saturated or unsaturated monovalent hydrocarbon group having a perfluoroalkyl group and having 2 to 22 carbon atoms.

[2] The electrolyte solution for a lithium ion secondary battery according to [1], wherein the compound is a compound represented by the following general formula (1):

[Formula 1]

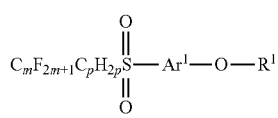

wherein $Ar^1$ denotes a substituted or nonsubstituted divalent aromatic group having 5 to 30 atoms of the nucleus(es); $R^1$ denotes a saturated or unsaturated monovalent hydrocarbon group having 1 to 20 carbon atoms; and m denotes a natural number of 2 to 16, and p denotes an integer of 0 to 6.

[3] The electrolyte solution for a lithium ion secondary battery described in [1] or [2], wherein the $Ar^1$ is a substituted or nonsubstituted divalent aromatic group having 8 to 20 atoms of the nucleus(es).

[4] The electrolyte solution for a lithium ion secondary battery described in any one of [1] to [3], wherein the $Ar^1$ is a group selected from the group consisting of a biphenylene group, a naphthylene group, a terphenylene group and an anthranylene group.

[5] The electrolyte solution for a lithium ion secondary battery described in any one of [1] to [4], wherein the nonaqueous solvent is a mixed solvent of two or more solvents.

[6] The electrolyte solution for a lithium ion secondary battery described in any one of [1] to [5], wherein the electrolyte solution is a gelatinized electrolyte solution.

[7] A lithium ion secondary battery comprising:
an electrolyte solution for a lithium ion secondary battery described in any one of [1] to [6];
a positive electrode comprising one or more materials selected from the group consisting of materials capable of doping and dedoping lithium ions, as a positive electrode active substance; and
a negative electrode comprising one or more materials selected from the group consisting of materials capable of doping and dedoping lithium ions and metallic lithium, as a negative electrode active substance.

[8] The lithium ion secondary battery described in [7], wherein the positive electrode comprises a lithium-containing compound as the positive electrode active substance.

[9] The lithium ion secondary battery described in [8], wherein the lithium-containing compound comprises one or more compounds selected from the group consisting of metal oxides containing lithium and metal chalcogenides containing lithium.

[10] The lithium ion secondary battery described in any one of [7] to [9], wherein the negative electrode comprises one or more materials selected from the group consisting of metallic lithium, carbon materials, and materials containing an element capable of forming an alloy with lithium, as the negative electrode active substance.

[11] A fluoroalkane derivative represented by the following general formula (Z):

wherein $Ar^1$ denotes a substituted or nonsubstituted divalent aromatic group having 5 to 30 atoms of the nucleus(es); $R^1$ denotes a saturated or unsaturated monovalent hydrocarbon group having 1 to 20 carbon atoms; and R denotes a saturated or unsaturated monovalent hydrocarbon group having a perfluoroalkyl group and having 2 to 22 carbon atoms.

[12] The fluoroalkane derivative according to [11], being represented by the following general formula (1):

[Formula 2]

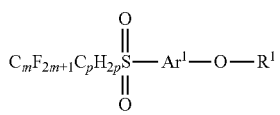

wherein $Ar^1$ denotes a substituted or nonsubstituted divalent aromatic group having 5 to 30 atoms of the nucleus(es); $R^1$ denotes a saturated or unsaturated monovalent hydrocarbon group having 1 to 20 carbon atoms; and m denotes a natural number of 2 to 16, and p denotes an integer of 0 to 6.

[13] The fluoroalkane derivative according to [11] or [12], wherein the $Ar^1$ is a substituted or nonsubstituted divalent aromatic group having 8 to 20 atoms of the nucleus(es).

[14] The fluoroalkane derivative according to any one of [11] to [13], wherein the $Ar^1$ is a condensed ring having one or more aromatic hydrocarbon rings, or a group having a plurality of aromatic rings connected by a single bond(s), one or more of the aromatic rings being an aromatic hydrocarbon ring.

[15] The fluoroalkane derivative according to any one of [11] to [14], wherein the $Ar^1$ is a group selected from the group consisting of a biphenylene group, a naphthylene group, a terphenylene group and an anthranylene group.

[16] A gelling agent comprising a fluoroalkane derivative according to any one of [11] to [15].

[17] The gelling agent according to [16], wherein the $Ar^1$ is a substituted or nonsubstituted divalent aromatic group having 8 to 20 atoms of the nucleus(es).

[18] The gelling agent according to [16] or [17], wherein the $Ar^1$ is a group selected from the group consisting of a biphenylene group, a naphthylene group, a terphenylene group and an anthranylene group.

[19] A gelatinous composition comprising a gelling agent according to any one of [16] to [18], and a nonaqueous solvent.

[20] An electrode for an electrochemical device, comprising a gelling agent according to any one of [16] to [18].

[21] An electrolyte solution for a dye-sensitized solar battery, comprising a gelling agent according to any one of [16] to [18].

[22] A carbon dioxide-absorbing composition comprising a gelling agent according to any one of [16] to [18], and an ionic liquid.

Advantageous Effects of Invention

The present invention can provide an electrolyte solution for a lithium ion secondary battery and a lithium ion secondary battery having high battery characteristics (for example, charge/discharge characteristics, low-temperature operability and high-temperature durability) and simultaneously also achieving high safety (for example, liquid leakage reducing property, dendrite suppression and flame retardancy), a novel fluoroalkane derivate, a gelling agent and a gelatinous composition used therefor, and an electrode for an electrochemical device, an electrolyte solution for a dye-sensitized solar battery and a carbon dioxide-absorbing composition.

BRIEF DESCRIPTION OF DRAWING

FIG. 1 is a sectional view schematically illustrating one example of the lithium ion secondary battery according to the present embodiment.

DESCRIPTION OF EMBODIMENT

Hereinafter, the embodiment according to the present invention (hereinafter, referred to simply as "the present embodiment") will be described in detail. The electrolyte solution for a lithium ion secondary battery (hereinafter, also referred to simply as "electrolyte solution") according to the present embodiment comprises one or more compounds selected from the group consisting of a nonaqueous solvent, a lithium salt and a compound represented by the general formula (Z) shown above, preferably a compound represented by the general formula (1) shown above. The lithium ion secondary battery according to the present embodiment also comprises the electrolyte solution, a positive electrode comprising one or more materials selected from the group consisting of materials capable of doping and dedoping lithium ions, as a positive electrode active substance, and a negative electrode comprising one or more materials selected from the group consisting of negative electrode materials capable of doping and dedoping lithium ions and metallic lithium, as a negative electrode active substance. Additionally, the gelling agent according to the present embodiment is a fluoroalkane derivative having an alkylsulfonyl group having a perfluoroalkyl group and a hydrocarbonoxy group, and is a compound represented by the general formula (Z) shown above.

<Electrolyte Solution>

The electrolyte solution according to the present embodiment comprises (i) a nonaqueous solvent, (ii) a lithium salt, and (iii) a gelling agent.

(i) The nonaqueous solvent includes aprotic solvents, and is preferably an aprotic polar solvent. Specific examples thereof include cyclic carbonates typically represented by ethylene carbonate, propylene carbonate, 1,2-butylene carbonate, trans-2,3-butylene carbonate, cis-2,3-butylene carbonate, 1,2-pentylene carbonate, trans-2,3-pentylene carbonate, cis-2,3-pentylene carbonate, trifluoromethyl ethylene carbonate, fluoroethylene carbonate and 1,2-difluoroethylene carbonate; lactones typically represented by γ-butyrolactone and γ-valerolactone; cyclic sulfones typically represented by sulfolane; cyclic ethers typically represented by tetrahydrofuran and dioxane; chain carbonates typically represented by methyl ethyl carbonate, dimethyl carbonate, diethyl carbonate, methyl propyl carbonate, methyl isopropyl carbonate, dipropyl carbonate, methyl butyl carbonate, dibutyl carbonate, ethyl propyl carbonate and methyl trifluoroethyl carbonate; nitriles typically represented by acetonitrile; ethers typically represented by dimethyl ether; chain carboxylate esters typically represented by methyl propionate; and chain ether carbonate compounds typically represented by dimethoxyethane. These are used singly or in combination of two or more.

Particularly in order to raise the ionization degree of a lithium salt contributing to charge/discharge of a lithium ion secondary battery, the nonaqueous solvent preferably contains one or more cyclic aprotic polar solvents, and more preferably contains especially one or more cyclic carbonates.

The nonaqueous solvent is preferably a mixed solvent of two or more solvents in order to improve all of functions of dissolvability, conductivity and ionization degree of a lithium salt. Examples of nonaqueous solvents in the mixed solvent include the similar ones as described above.

(ii) The lithium salt is not especially limited as long as being one used as a usual nonaqueous electrolyte, and any one may be used. Specific examples of such a lithium salt include $LiPF_6$, $LiBF_4$, $LiClO_4$, $LiAsF_6$, $Li_2SiF_6$, and $LiOSO_2C_kF_{2k+1}$ [k is an integer of 1 to 8], $LiN(SO_2C_kF_{2k+2}$ [k is an integer of 1 to 8], $LiPF_n(C_kF_{2k+1})_{6-n}$ [n is an integer of 1 to 5, and k is an integer of 1 to 8], $LiBF_n(C_kF_{2k+1})_{4-n}$ [n is an integer of 1 to 3, and k is an integer of 1 to 8], lithium bis(oxalate)borate represented by $LiB(C_2O_4)_2$, lithium difluorooxalylborate represented by $LiBF_2(C_2O_2)$, and lithium trifluorooxalylphosphate represented by $LiPF_3(C_2O_2)$.

Lithium salts represented by the general formulae (5a), (5b) and (5c) shown below may be used as well.

$$LiC(SO_2R^{11})(SO_2R^{12})(SO_2R^{13}) \qquad (5a)$$

$$LiN(SO_2OR^{14})(SO_2OR^{15}) \qquad (5b)$$

$$LiN(SO_2R^{16})(SO_2R^{17}) \qquad (5c)$$

wherein $R^{11}$, $R^{12}$, $R^{13}$, $R^{14}$, $R^{15}$, $R^{16}$ and $R^{17}$ may be identical or different from each other, and denote a perfluoroalkyl group having 1 to 8 carbon atoms.

These lithium salts are used singly or in combination of two or more. Among these lithium salts, especially $LiPF_6$, $LiBF_4$, and $LiN(SO_2C_kF_{2k+1})_2$ [k is an integer of 1 to 8] are preferable.

A lithium salt is contained preferably in a concentration of 0.1 to 3 mol/L, and more preferably 0.5 to 2 mol/L in the electrolyte solution.

(iii) The gelling agent to be used is a compound represented by the general formula (Z) shown above, preferably the general formula (1) shown above (fluoroalkane derivative).

In the general formula (Z) shown above, R denotes a saturated or unsaturated monovalent hydrocarbon group having a perfluoroalkyl group and having 2 to 22 carbon atoms, and may be an aliphatic hydrocarbon group, and may have further an aromatic hydrocarbon group. In the case where the hydrocarbon group is a monovalent aliphatic hydrocarbon group, the hydrocarbon group may be a branched one or non-branched one. In the case where the monovalent hydrocarbon group has an aromatic hydrocarbon group, the aromatic hydrocarbon group may or may not have further a substituent. The monovalent hydrocarbon group may have a perfluoroalkyl group in the main chain of the molecule, or in the side chain thereof. Further, the monovalent hydrocarbon group may have one perfluoroalkyl group, or two or more perfluoroalkyl groups. The perfluoroalkyl group may be a straight-chain one or a branched-chain one. The perfluoroalkyl group has preferably 2 to 12 carbon atoms, and more preferably 2 to 6 carbon atoms. The perfluoroalkyl group is preferably a straight-chain one. A longer perfluoroalkyl group exhibits a higher gelling power; and with a shorter perfluoroalkyl group, the availability of the raw materials and the synthesis become easier.

Hereinafter, as a fluoroalkane derivative represented by the general formula (Z) shown above, a preferable compound (hereinafter, referred to as "compound (1)") represented by the general formula (1) shown above will be described as an example, but examples of the derivative are not limited thereto. The compound (1) is an aromatic compound having a perfluoroalkyl(oligomethylene)sulfonyl group and a hydrocarbonoxy group. In the general formula (1), $Ar^1$ denotes a substituted or nonsubstituted divalent aromatic group having 5 to 30 atoms of the nucleus(es). The divalent aromatic group is a cyclic divalent group exhibiting so-called "aromaticity". The divalent aromatic group may be a carbocyclic group or a heterocyclic group. These divalent aromatic groups may be ones substituted with a substituent, or may be nonsubstituted ones. The substituent of the divalent aromatic group may be selected from the viewpoint of easily permitting the introduction of a perfluoroalkyl(oligomethylene)thio group and the introduction of a hydrocarbonoxy group as described later. Alternatively, the substituent of the divalent aromatic group may be selected from the viewpoint of the dissolving temperature and the gelling power of a gelling agent.

The carbocyclic group has 6 to 30 atoms of the nucleus(es), and may be one substituted with a substituent or a nonsubstituted one. Specific examples thereof include divalent groups having a nucleus(es) typically represented by a phenylene group, a biphenylene group, a terphenylene group, a naphthylene group, an anthranylene group, a phenanthrylene group, a pyrenylene group, a chrysenylene group and a fluoranthenylene group.

The heterocyclic group has 5 to 30 atoms of the nucleus(es), and examples thereof include divalent groups having a nucleus(es) typically represented by a pyrrolene group, a furanylene group, a thiophenylene group, a triazolene group, an oxadiazolene group, a pyridylene group and a pyrimidylene group.

$Ar^1$ is preferably a substituted or nonsubstituted divalent aromatic group having 8 to 20 atoms of the nucleus(es) from the viewpoint of the easiness of raw material availability and synthesis and from the viewpoint of the gelling power to an electrolyte solution, and more preferably a group selected from the group consisting of a biphenylene group, a naphthylene group, a terphenylene group and an anthranylene group.

The carbocyclic group has preferably 10 to 30 atoms of the nucleus(es), and may be substituted with a substituent, or may be a non-substituted one. Specific examples thereof include divalent groups having a nucleus(es) represented by a biphenylene group, a terphenylene group, a naphthylene group, an anthranylene group, a phenanthrylene group, a pyrenylene group, a chrysenylene group and a fluoranthenylene group. The carbocyclic group may have two or more divalent groups described above (which may be identical or different from each other) in the range of 10 to 30 atoms of the nucleus(es).

The heterocyclic group has preferably 8 to 30 atoms of the nucleus(es), and examples thereof include divalent groups having two or more nucleuses (which may be identical or different from each other) represented by a furanylene group, a thiophenylene group, a triazolene group, an oxadiazolene group, a pyridylene group and a pyrimidylene group in the range of 8 to 30 atoms of the nucleus(es).

Further, $Ar^1$ may be a group having both the carbocyclic group and the heterocyclic group described above in the range of 8 to 30 atoms of the nucleus(es).

The substituent described above includes an alkyl group represented by a methyl group and an ethyl group, and a halogen atom.

Since $Ar^1$ having 8 or more atoms of the nucleus(es) exhibits a high gelling power, and raises the versatility of selecting the structure and the number of carbon atoms of $C_mF_{2m+1}C_pH_{2p}$ and $R^1$, it is preferable. The raw materials of a compound (1) in which $Ar^1$ has 30 or less atoms of the nucleus(es) are easily available, and the synthesis also is easy, which is preferable.

Among these, from the viewpoint of the gelling power and the synthesis easiness, the divalent aromatic group is preferably a group which is a condensed ring having one or more substituted or nonsubstituted aromatic hydrocarbon rings (more preferably benzene rings), or a group having a plurality of aromatic rings connected by a single bond(s), one or more of the aromatic rings being an aromatic hydrocarbon ring (more preferably a benzene ring). The divalent aromatic group is still more preferably a substituted or nonsubstituted biphenylene group, terphenylene group, naphthylene group, anthranylene group and phenylene pyridylene group (-Ph-Py-, wherein Ph denotes a benzene ring, and Py denotes a pyridine ring), and most preferably a biphenylene group. The substituent described above includes an alkyl group represented by a methyl group and an ethyl group, and a halogen atom. In the present description, "an aromatic ring" may be carbocyclic or heterocyclic.

$R^1$ denotes a saturated or unsaturated monovalent hydrocarbon group having 1 to 20 carbon atoms, and may be an aliphatic hydrocarbon group, and may further have an aromatic hydrocarbon group. In the case where the hydrocarbon group is a monovalent aliphatic hydrocarbon group, the hydrocarbon group may be branched or non-branched. Further in the case where the monovalent hydrocarbon group has an aromatic hydrocarbon group, the aromatic hydrocarbon group may further have a substituent, or no substituent. However, the monovalent hydrocarbon group, in order that a compound (1) is dissolved in a nonaqueous solvent, which is then gelatinized, is preferably a hydrocarbon group, capable of dissolving the compound (1) in the nonaqueous solvent, such as an arylalkyl group typically represented by a benzyl group. If the monovalent hydrocarbon group has 21 or more carbon atoms, the raw material becomes difficult to procure. The monovalent hydrocarbon group represented by $R^1$ is preferably an alkyl group having 1 to 14 carbon atoms, more preferably an alkyl group having 5 to 14 carbon atoms, and still more preferably an alkyl group having 6 to 10 carbon atoms, from the viewpoint of effectively and securely exhibiting the above-mentioned effect according to the present invention, and from the viewpoint of the gelling power, synthesis easiness and handleability. Further, $R^1$ is preferably a straight chain alkyl group from the viewpoint of the gelling power and the handleability.

m denotes a natural number of 2 to 16, and is preferably a natural number of 4 to 10. By making the range of m in the range described above, a compound (1) exhibits a higher gelling power, and becomes one excellent in the easiness of synthesis and the handleability as well.

m is preferably a natural number of 2 to 12, and more preferably a natural number of 2 to 6. By adjusting the range of m in the range described above, the compound (1) can acquire a higher gelling power, the handleability, synthesis easiness and easiness in raw material availability.

From the viewpoint of the gelling power of the compound (1), p denotes an integer of 0 to 6, and preferably a natural number of 2 to 4.

Further from the viewpoint that the compound (1) has an excellent gelling power for various types of nonaqueous solvents, and from the viewpoint that a composition including the compound (1) can exist stably as a gelatinous composition, the sum total of the value of m and the number of carbon atoms in $R^1$ is preferably 7 to 20, more preferably 8 to 16, and still more preferably 10 to 14.

The synthesis method of a compound (1) is not especially limited, and the compound (1) can be synthesized by an optional method. For example, the compound (1) may be synthesized by first preparing a skeleton of an aromatic group, and thereafter reacting both the terminals with an alkyl chain or the like, or may be synthesized by first preparing chains of both the terminals, and finally synthesizing a predetermined aromatic.

In production of a compound (1), for example, a perfluoroalkyl(oligomethylene)thio group is first introduced to an aromatic compound having a hydroxyl group and a thiol group and represented by the general formula (1a) shown below, and thereafter, a hydrocarbonoxy group is introduced thereto to obtain a compound (hereinafter, referred to as "compound (1')") represented by the general formula (1') shown below. Thereafter, a sulfide group in the perfluoroalkyl (oligomethylene)thio group is oxidized to be displaced to a sulfonyl group, to produce the compound (1).

[Formula 3]

wherein $Ar^1$, $R^1$, m and p are the same meaning as in the general formula (1), respectively.

[Introduction of a Perfluoroalkyl(oligomethylene)thio Group]

An aromatic compound represented by the general formula (1a) shown below is dissolved in a solvent such as tetrahydrofuran (THF), and is reacted with a halogenated compound having a perfluoroalkyl(oligomethylene) group and represented by the general formula (1b) shown below in the presence of a base such as an amine group. Thereafter, the reaction solution is neutralized with hydrochloric acid; and the solvent and unreacted substances are distilled out to produce an aromatic compound, which has a hydroxyl group and a perfluoroalkyl(oligomethylene) group, represented by the general formula (1c) shown below. In the each formula, $Ar^1$, m and p are the same meaning as in the general formula (1) shown above, respectively, and $X^1$ denotes a halogen atom reactive with a thiol group, and includes, for example, a chlorine atom, a bromine atom, an iodine atom and a fluorine atom.

[Introduction of a Hydrocarbonoxy Group]

A halogenated hydrocarbon and a base (for example, an alkali metal compound such as $K_2CO_3$) are added to a solution in which an aromatic compound represented by the general formula (1c) shown above is dissolved in a solvent (for example, 3-pentanone), and refluxed and reacted. After the completion of the reaction, the reaction solution is once filtrated as required; and the solvent and unreacted substances are distilled out from the reaction solution; and the residue is purified by silica gel chromatography. The hydrocarbonoxy group is thus introduced to obtain a compound (1'). A halogen atom in the halogenated hydrocarbon suffices if having the reactivity with a hydroxyl group OH of an aromatic compound represented by the general formula (1c) shown above, and includes a chlorine atom, a bromine atom, an iodine atom and a fluorine atom.

[Oxidation of a Sulfide Group to a Sulfonyl Group]

An oxidizing agent such as a hydrogen peroxide solution is added to a solution in which a compound (1') is dissolved in a solvent, and oxidatively reacted under heating and stirring in the presence of an acetic acid or the like. After the completion of the reaction, the resultant is extracted and separated using an ether and water; a water phase is removed; thereafter, the solvent and unreacted substances are distilled out from an organic phase; and the residue is purified by silica gel chromatography. The sulfide group is thus oxidized to a sulfonyl group to obtain a compound (1).

As such a synthesis method, for example, a synthesis method described in WO 2009/78268 can be referred to.

In the case where $Ar^1$ is a group having a plurality of aromatic rings connected by a single bond(s) such as a biphenylene group, a terphenylene group, a phenylene pyridylene group and the like, a compound (1) can be obtained, for example, by a synthesis method described below. First, a thiol compound represented by the following general formula (1d) is sulfidized with a compound represented by the general formula (1b) shown above in a solvent such as dry THF in the presence of a base such as triethyleneamine to obtain a compound represented by the following general formula (1e). Here, in the formulae (1d) and (1e), m and p are each the same as in the formula (1); $X^3$ denotes a halogen atom such as a bromine atom; and $Ar^2$ denotes a part of the divalent aromatic hydrocarbon group constituting $Ar^1$ in the general formula (1) shown above.

Then, the compound represented by the general formula (1e) shown above is oxidized with an oxidizing agent such as hydrogen peroxide in the presence of a catalyst such as acetic acid to obtain a compound (1f) shown below. Here, in the formula (1f), $Ar^2$, $X^3$, m and p are each the same as in the formula (1e).

$$C_mF_{2m+1}C_pH_{2p}-SO_2-Ar^2-X^3 \tag{1f}$$

Then, from a compound represented by the general formula (1f) shown above and a compound represented by the following general formula (1g), a compound (1) is obtained in a basic aqueous solution such as $K_2CO_3$ in the presence of a palladium catalyst through Suzuki-Miyaura coupling. Here, in the formula (1g), $R^1$ is the same as in the general formula (1); $Ar^3$ is a part of the divalent aromatic hydrocarbon group constituting $Ar^1$ in the general formula (1) shown above, and denotes the part different from $Ar^2$; and $Ar^2$ and $Ar^3$ are connected by a single bond to make $Ar^1$.

$$R^1-O-Ar^3-B(OH)_2 \tag{1g}$$

The production method of a compound (1) is not limited to the above-mentioned method.

A compound (1) can gelatinize a variety of nonaqueous solvents in a small amount of the addition of about 5% or less. The compound (1) is added to a nonaqueous solvent, and heated to be dissolved; and the produced solution is returned to an ordinary temperature to thereby gelatinize the nonaqueous solvent. By adding a compound (1) in a small amount of, for example, 0.3 to 5% by mass, preferably about 0.5 to 3% by mass to a high-permittivity solvent suitable for an electrolyte solution, for example, a cyclic carbonate typically represented by propylene carbonate and butylene carbonate; a lactone typically represented by γ-butyrolactone and γ-valerolactone; and a nitrile typically represented by acetonitrile, the solvent can be gelatinized. By gelatinizing an electrolyte solution, the safety can be improved from the viewpoint of the liquid leakage reduction and the combustion retardation.

When a compound (1) is used for the lithium ion secondary battery according to the present embodiment, it is preferable that a lithium salt, such as $LiClO_4$, $LiPF_6$, $LiN(CF_3SO_2)_2$, $LiN(C_2F_5SO_2)_2$, $LiBF_4$ or $LiOSO_2CF_3$, is dissolved in a nonaqueous solvent, and the compound (1) is added thereto to gelatinize the solvent.

These gelling agents are used singly or in combination of two or more.

The mixing ratio of a gelling agent and a nonaqueous solvent is optional, but on the mass basis, a gelling agent:a nonaqueous solvent is preferably 0.1:99.9 to 20:80, more preferably 0.3:99.7 to 10:90, and still more preferably 0.3:99.7 to 5:95, from the viewpoint of improving the gelling power and the handleability. A more amount of a gelling agent gives a higher phase transition point and a firmer gel; and a less amount thereof gives a gel having a lower viscosity and exhibiting easier handleability.

The mixing ratio of a nonaqueous solvent, a lithium salt and a gelling agent can be selected according to the purpose. To a mixed liquid in which preferably 0.1 to 3 mol/L, more preferably 0.5 to 2 mol/L of a lithium salt is mixed in a nonaqueous solvent, a gelling agent is added, in terms of the gelling agent:the nonaqueous solvent on the mass basis, preferably in 0.1:99.9 to 20:80, more preferably 0.3:99.7 to 10:90, and still more preferably 0.3:99.7 to 5:95. By fabricating an electrolyte solution in such a composition, all of the battery characteristics, handleability and safety can be more improved.

As a nonaqueous solvent, aprotic polar solvents are preferably used, but above all, the nonaqueous solvent preferably contains one or more cyclic aprotic polar solvents. The nonaqueous solvent preferably contains, as cyclic aprotic polar solvents, cyclic carbonates typically represented by, for example, ethylene carbonate and propylene carbonate. Cyclic compounds have a high permittivity, and help the ionization of a lithium salt and are also effective to enhance the gelling power.

As a lithium salt, various types of salts thereof can be selected according to the purpose, but preferable are $LiPF_6$, $LiBF_4$ and $LiN(SO_2C_kF_{2k+1})_2$ [k is an integer of 1 to 8]. The lithium salt can enhance the gelling power in addition to the battery characteristics and safety.

<Positive Electrode>

The positive electrode is not especially limited as long as acting as a positive electrode of a lithium ion secondary battery, and may be a well-known one. The positive electrode preferably contains one or more materials selected from the group consisting of materials capable of doping and dedoping lithium ions, as a positive electrode active substance. Examples of such a material include composite oxides represented by the general formulae (6a) and (6b) shown below, and metal chalcogenides and metal oxides having a tunnel structure or a layered structure.

$$Li_xMO_2 \tag{6a}$$

$$Li_yM_2O_4 \tag{6b}$$

wherein M denotes one or more metals selected from transition metals; and x denotes a number of 0 to 1, and y denotes a number of 0 to 2.

More specific examples thereof include lithium cobalt oxides typically represented by $LiCoO_2$; lithium manganese oxides represented by $LiMnO_2$, $LiMn_2O_4$ and $Li_2Mn_2O_4$; lithium nickel oxides typically represented by $LiNiO_2$; composite metal oxides containing lithium typically represented by $Li_zMO_2$ (M denotes two or more elements selected from the group consisting of Ni, Mn, Co, Al and Mg, and z denotes a number exceeding 0.9 and less than 1.2); and lithium iron phosphate olivines represented by $LiFePO_4$. Examples of the positive electrode active substance also include oxides of metals other than lithium, typically represented by S, $MnO_2$, $FeO_2$, $FeS_2$, $V_2O_5$, $V_6O_{13}$, $TiO_2$, $TiS_2$, $MoS_2$ and $NbSe_2$. Further examples of the positive electrode active substance include conductive polymers typically represented by polyaniline, polythiophene, polyacetylene and polypyrrole.

If a lithium-containing compound is used as a positive electrode active substance, a high voltage and a high energy density are likely to be obtained, which is preferable. Such a lithium-containing compound suffices if containing lithium, and examples thereof include composite oxides containing lithium and a transition metal element, phosphate compounds containing lithium and a transition metal element, and silicate metal compounds containing lithium and a transition metal element (for example, $Li_tM_uSiO_4$, wherein M has the same meaning as in the formula (6a) shown above; t denotes a number of 0 to 1, and u denotes a number of 0 to 2). From the viewpoint of obtaining a higher voltage, especially composite oxides and phosphate compounds are preferable which contain lithium and one or more transition metal elements selected from the group consisting of cobalt (Co), nickel (Ni), manganese (Mn), iron (Fe), copper (Cu), zinc (Zn), chromium (Cr), vanadium (V) and titanium (Ti).

As such lithium-containing compounds, more specifically preferable are metal oxides containing lithium, metal chalcogenides containing lithium and metal phosphate compounds containing lithium, and examples thereof include compounds represented by the general formulae (7a) and (7b) shown below.

$$Li_vM^IO_2 \tag{7a}$$

$$Li_wM^{II}PO_4 \tag{7b}$$

wherein $M^I$ and $M^{II}$ each denote one or more transition metal elements; and values of v and w depend on the charge/discharge state of a battery, but v usually denote a number of 0.05 to 1.10 and a number of 0.05 to 1.10, respectively.

Compounds represented by the general formula (7a) shown above generally have a layered structure; and compounds represented by the general formula (7b) shown above generally have an olivine structure. These compounds include, in order to stabilize the structure and otherwise, ones in which part of transition metal elements are substituted with Al, Mg and other transition metal elements, or these are made contained in grain boundaries, and ones in which part of oxygen atoms are substituted with fluorine atoms and the like. These compounds further include ones in which at least a part of the surface of a positive electrode active substance is coated with another positive electrode active substance.

The positive electrode active substance is used singly or in combination of two or more.

The number-average particle diameter (primary particle diameter) of a positive electrode active substance is preferably 0.05 μm to 100 μm, and more preferably 1 μm to 10 μm. The number-average particle diameter of a positive electrode active substance can be measured by a wet-type particle diameter analyzer (for example, a laser diffraction/scattering particle size distribution analyzer and a dynamic scattering particle size analyzer). Alternatively, 100 particles of particles observed by a transmission electron microscope are randomly extracted, and analyzed by an image analysis software (for example, "A-Zo-Kun" by trade name, made by Asahi Kasei Engineering Corp.) to obtain the particle diameter as an arithmetic average. In this case, if number-average particle diameters are different between measurement methods in the same sample, calibration curves fabricated using a standard sample as a measurement object may be used.

A positive electrode is obtained, for example, as follows. That is, a positive electrode mixture-containing paste is first prepared by dispersing, in a solvent, a positive electrode mixture obtained by adding a conductive aid, a binder and the like, as required, to the positive electrode active substance. Then, the positive electrode mixture-containing paste is applied on a positive electrode current collector, and dried to form a positive electrode mixture layer, which is, as required, pressurized and regulated in the thickness to fabricate a positive electrode.

Here, the solid-content concentration of the positive electrode mixture-containing paste is preferably 30 to 80% by mass, and more preferably 40 to 70% by mass.

The positive electrode current collector is constituted of a metal foil such as an aluminum foil or a stainless steel foil.

<Negative Electrode>

The negative electrode is not especially limited as long as acting as a negative electrode of a lithium ion secondary battery, and may be a well-known one. The negative electrode preferably contains one or more materials selected from the group consisting of materials capable of doping and dedoping lithium ions and metallic lithium, as a negative electrode active substance. Examples of such materials include, in addition to metallic lithium, carbon materials typically represented by amorphous carbon (hard carbon), artificial graphite, natural graphite, graphite, pyrolytic carbon, coke, glassy carbon, sintered compacts of organic polymer compounds, mesocarbon microbeads, carbon fiber, activated carbon, graphite, carbon colloid and carbon black. Among these, examples of the coke include pitch coke, needle coke and petroleum coke. The sintered compacts of organic polymer compounds are ones obtained by sintering and carbonizing polymer materials such as phenol resins and furan resins at a suitable temperature. In the present invention, batteries employing metallic lithium as the negative electrode active substance are included in the lithium ion secondary battery.

Materials capable of doping and dedoping lithium ions further include materials containing an element capable of forming an alloy with lithium. The material may be a single substance of a metal or a semimetal, or an alloy thereof, or may be a material which has one or more phases of these as at least a part of the material.

In the present description, an "alloy" includes, in addition to ones composed of two or more metal elements, ones having one or more metal elements and one or more semimetal elements. If an alloy has metallic properties as a whole, the alloy may contain a nonmetal element. In the texture of the alloy, a solid solution, a eutectic (eutectic mixture), an intermetallic compound or two or more thereof coexist.

Examples of such metal elements and semimetal elements include titanium (Ti), tin (Sn), lead (Pb), aluminum, indium (In), silicon (Si), zinc (Zn), antimony (Sb), bismuth (Bi), gallium (Ga), germanium (Ge), arsenic (As), silver (Ag), hafnium (Hf), zirconium (Zr) and yttrium (Y).

Above all, metal elements and semimetal elements of Group 4 or 14 in the long-form periodic table of the elements are preferable, and especially preferable are titanium, silicon and tin.

Examples of tin alloys include ones having, as a second constituent element other than tin, one or more elements selected from the group consisting of silicon, magnesium (Mg), nickel, copper, iron, cobalt, manganese, zinc, indium, silver, titanium (Ti), germanium, bismuth, antimony and chromium (Cr).

Examples of silicon alloys include ones having, as a second constituent element other than silicon, one or more elements selected from the group consisting of tin, magnesium, nickel, copper, iron, cobalt, manganese, zinc, indium, silver, titanium, germanium, bismuth, antimony and chromium.

Examples of compounds of titanium, compounds of tin and compounds of silicon include ones having oxygen (O) or carbon (C), and these may have, in addition to titanium, tin or silicon, an above-mentioned second constituent element.

The negative electrode active substance is used singly or in combination of two or more.

The number-average particle diameter (primary particle diameter) of the negative electrode active substance is preferably 0.1 μm to 100 μm, and more preferably 1 μm to 10 μm. The number-average particle diameter of a negative electrode active substance is measured as in the number-average particle diameter of a positive electrode active substance.

A negative electrode is obtained, for example, as follows. That is, a negative electrode mixture-containing paste is first prepared by dispersing, in a solvent, a negative electrode mixture obtained by adding a conductive aid, a binder and the like, as required, to the negative electrode active substance. Then, the negative electrode mixture-containing paste is applied on a negative electrode current collector, and dried to form a negative electrode mixture layer, which is, as required, pressurized and regulated in the thickness to fabricate a negative electrode.

Here, the solid-content concentration of the negative electrode mixture-containing paste is preferably 30 to 80% by mass, and more preferably 40 to 70% by mass.

The negative electrode current collector is constituted of a metal foil such as a copper foil, a nickel foil or a stainless steel foil.

Examples of the conductive aid used as required in fabrication of a positive electrode and a negative electrode include graphite, and carbon black typically represented by acetylene black and Ketjen Black, and carbon fiber. The number-average particle diameter (primary particle diameter) of the conductive aid is preferably 0.1 µm to 100 µm, and more preferably 1 µm to 10 µm, and measured as in the number-average particle diameter of a positive electrode active substance. Examples of the binder include PVDF, PTFE, polyacrylic acid, styrene-butadiene rubber and fluororubber.

The electrodes (positive electrode and negative electrode) according to the present embodiment may comprise one or two or more compounds (1). A method for making a compound (1) contained in an electrode may involve, for example, the simultaneously introducing the compound (1) when an electrode active substance mixture is prepared, or later applying and coating the compound (1) on a fabricated electrode. A method for applying or coating a compound (1) on an electrode is not especially limited, and may involve, for example, preparing a solution or a slurry in which a compound (1) is dissolved or dispersed in a solvent (preferably a nonaqueous solvent), and applying or coating the solution or the slurry on an electrode by a bar coat method, or applying or coating by a cast method. Alternatively, the solution or the slurry may be applied by a spray method or brush coating. The application may be carried out using other various different coating apparatuses.

Making a compound (1) contained in an electrode improves the safety, reliability and durability of the electrode and a lithium ion secondary battery equipped with the electrode.

The content of a compound (1) in the electrode according to the present embodiment is not especially limited as long as the content is in the range of not inhibiting the function as the electrode. The content is, from the viewpoint of adhesive retention and safety improvement, preferably 0.1 to 20.0 parts by mass, and more preferably 1.0 to 10.0 parts by mass, based on 100 parts by mass of an electrode active substance.

<Separator>

The lithium ion secondary battery according to the present embodiment is preferably equipped with a separator between the positive electrode and the negative electrode from the viewpoint of preventing short circuit between the positive and negative electrodes and imparting the safety such as shutdown. The separator may be the similar one as equipped in well-known lithium ion secondary batteries, and is preferably an insulating thin membrane having a high ion permeability and an excellent mechanical strength.

Examples of the material of a separator used in the present embodiment include ceramics, glasses, resins and celluloses. The resin may be a synthetic resin or a natural resin (natural polymer), and may be an organic resin or an inorganic resin, but is preferably an organic resin from the viewpoint of superiority in the performance as the separator. Examples of the organic resin include polyolefin, polyester, polyamide, and heat-resistant resins such as liquid crystal polyester and aramid. The material of a separator other than a phase-transition type gelling agent is, from the viewpoint of high heat resistance, preferably ceramic and glass, and from the viewpoint of handleability and heat resistance, preferably polyester, polyamide, liquid crystal polyester, aramid and cellulose. Further, the material of a separator other than a phase-transition type gelling agent is, from the viewpoint of costs and processability, preferably polyolefin. In the case of employing a resin among these materials, the resin being a homopolymer may be used, or a copolymer resin may be used. A mixture or alloy of a plurality of resins may be used. The separator may be a laminate obtained by laminating membranes of a plurality of materials. In the case where the separator is a laminate, the materials of each layer may be identical to or different from each other. In the case of fabricating a separator of a laminate, the laminate may be fabricated by repeating the formation of one layer on another layer to successively laminating layers, that is, by successive multilayering, or may be fabricated by laminating a plurality of membranes, each fabricated separately.

Examples of the form of a separator used in the present embodiment include synthetic resin microporous membranes produced from synthetic resins, woven fabrics, nonwoven fabrics, knitted fabrics and papers processed from a fiber produced by spinning a synthetic resin or a natural polymer, a glass fiber or a ceramic fiber and membranes fabricated by arranging, microparticles of a synthetic resin and a glass.

A separator may be obtained by overlapping a plurality of membranes fabricated by a plurality of production methods, or by successive multilayering by a plurality of production methods.

The separator of the present embodiment, from the viewpoint of the reinforcement of a membrane, the aid of charge and discharge, the improvement in heat resistance and the like, may contain components other than the above-mentioned components, for example, an organic filler, an inorganic filler, an organic particle or an inorganic particle, on the surface of and/or inside the separator.

The lithium ion secondary battery according to the present embodiment is, for example, a lithium ion secondary battery whose sectional view is schematically illustrated in FIG. 1. The lithium ion secondary battery 100 illustrated in FIG. 1 comprises a separator 110, a positive electrode 120 and a negative electrode 130 interposing the separator 110 from both sides thereof, a positive electrode current collector 140 (arranged outside the positive electrode) and a negative electrode current collector 150 (arranged outside the negative electrode) interposing the laminate of the positive electrode 120, the separator 110 and the negative electrode 130, and a battery armor 160 which accommodate them. The laminate of the positive electrode 120, the separator 110 and the negative electrode 130 is impregnated with the electrolyte solution according to the present embodiment. These respective members to be usable are ones equipped in conventional lithium ion secondary batteries, excluding the electrolyte solution, and may be, for example, the above-mentioned ones.

<Fabrication Method of a Battery>

The lithium ion secondary battery according to the present embodiment is fabricated by a well-known method by using the above-mentioned electrolyte solution, positive electrode, negative electrode, and as required, separator. For example, the positive electrode and the negative electrode are wound in a laminate state with the separator interposed therebetween to be formed into a laminate of a wound structure, or these are folded or laminated as a plurality of layers to be formed into a laminate in which the separator is interposed between pluralities of the positive electrodes and the negative electrodes alternately laminated. Then, the laminate is accommodated in a battery case (armor); the electrolyte solution according to the present embodiment is injected inside the case to impregnate the laminate with the electrolyte solution; and the case is sealed, whereby the lithium ion secondary battery according to the present embodiment can be fabricated. Alternatively, an electrolytic membrane containing a gelatinized electrolyte solution is fabricated in advance; the positive electrode, the negative electrode, the electrolytic membrane, and as required, the separator are folded or laminated as described above to be formed into a laminate; and thereafter, the laminate is accommodated in a battery case, whereby a lithium ion secondary battery can be fabricated. The shape of the lithium ion secondary battery according to the present embodiment is not especially limited, and examples of the shape preferably employed are a cylindrical one, an oval one, a rectangular cylindrical one, a button-like one, a coin-like one and a laminate-like one.

The electrolyte solution for a lithium ion secondary battery according to the present embodiment actualizes a high conductivity (diffusion of lithium ions and transport number of lithium ions) and a high safety (for example, flame retardancy and liquid retainability); and the lithium ion secondary battery has high battery characteristics (for example, charge/discharge characteristics, low-temperature operability and high-temperature durability) and simultaneously actualizes a high safety (lithium dendrite) as well. Specifically, since the electrolyte solution contains a gelling agent exhibiting only a small influence on the properties of the electrolyte solution, the electrolyte solution for a lithium ion secondary battery, and the lithium ion secondary battery according to the present embodiment can suppress remarkable decreases in the low-temperature conductivity and the battery characteristics, which are seen in conventional polymer batteries. By making the electrolyte solution contain a gelling agent, the electrolyte solution is of course prevented from leaking outside the battery, and the lithium ion secondary battery according to the present embodiment can also reduce the dangerousness due to lithium dendrite and the dangerousness of combustion.

The electrode according to the present embodiment may be used as an electrode for the lithium ion secondary battery described above, and additionally as electrodes for various types of electrochemical devices. Making a compound (1) contained in an electrode for an electrochemical device improves the safety, reliability and durability of the electrode and an electrochemical device equipped with the electrode. The gelling agent of the present embodiment may be contained in an electrolyte solution for an electrochemical device.

Examples of the electrochemical device of the present embodiment include secondary batteries and accumulators represented by lithium ion secondary batteries, and capacitors represented by lithium ion capacitors and electric double-layer capacitors, and power generation members represented by fuel cells and solar batteries (for example, dye-sensitized solar batteries). Among these, the gelling agent of the present embodiment is preferably used in lithium ion secondary batteries and lithium ion capacitors. Aside from that the electrochemical device of the present embodiment comprises a gelling agent described above in an electrode and/or an electrolyte solution, the electrochemical device may have a conventionally known structure.

The electrolyte solution for a dye-sensitized solar battery of the present embodiment comprises one or two or more compounds (1) as gelling agents, and preferably further comprises a nonaqueous solvent and an electrolyte. The nonaqueous solvent used in the electrolyte solution for a dye-sensitized solar battery is not especially limited, and various types thereof can be used; but the nonaqueous solvent is preferably a solvent having a nitrile group, such as acetonitrile, propionitrile and methoxyacetonitrile, and more preferably acetonitrile. As a nonaqueous solvent for the electrolyte solution for a dye-sensitized solar battery, also an ionic liquid can be used. As the ionic liquid, various types thereof can be selected, but ionic liquids having a cation containing an imidazolium group are given attention to (for example, "Function Creation and Applications of Ionic Liquid", published by NTS Inc. in 2004), and are preferable. The electrolyte is not especially limited, and may be electrolytes contained in electrolyte solutions of conventional dye-sensitized solar batteries.

The content of a compound (1) in the electrolyte solution for a dye-sensitized solar battery of the present embodiment is not especially limited as long as the content is in the range of not inhibiting the function as a dye-sensitized solar battery. The content is, from the viewpoint of the gelling power and the performance as an electrolyte solution, preferably 0.1 to 7.0% by mass, and more preferably 0.5 to 5.0% by mass.

The gelling agent of the present embodiment may be contained in a carbon dioxide-absorbing composition together with an ionic liquid. A carbon dioxide-separation and recovery technology using an ionic liquid is given attention to as an environmental technology (For example, "Separation/Recovery and Storage/Isolation Technologies of $CO_2$", published by NTS Inc. in 2009). The carbon dioxide-absorbing composition has a feature of being capable of physically absorbing $CO_2$ selectively at nearly normal temperature, and capable of separating and recovering $CO_2$ in a simple operation. Ionic liquids usable are various types thereof, and are not especially limited, but ions having an imidazolium site or an ammonium site are preferable as cations. Ions containing fluorine are preferable, and bis(trifluoromethanesulfonylimide) ions are more preferable, as anions. An ionic liquid having a property of absorbing carbon dioxide is gelatinized with a gelling agent of a compound (1) to thereby prepare a carbon dioxide-absorbing composition thereof.

The content of the compound (1) in the carbon dioxide-absorbing composition of the present embodiment is not especially limited as long as the content is in the range of not inhibiting the function as the carbon dioxide-absorbing material. The content is, from the viewpoint of the gelling power, the carbon dioxide absorption capacity and the handleability, preferably 0.1 to 10.0% by mass, and more preferably 1.0 to 5.0% by mass.

The gelling agent of the present embodiment can gelatinize or solidify relatively many types of nonaqueous solvents in the addition of a small amount thereof, for example, 10% or less. Moreover, a gelatinous composition using the gelling agent hardly transforms to a sol even at a relatively high temperature, and can exist stably over a long period as a gel. Additionally, since the gelling agent usually has no hydrogen bondability or a weak one, the function of the gelling agent is secured even in nonaqueous solvents and systems in which hydrogen bonds cannot be stably present.

The gelatinous composition of the present embodiment comprises one or two or more compounds (1) and a nonaqueous solvent.

The nonaqueous solvent contained in the gelatinous composition of the present embodiment is not especially limited, but a nonaqueous solvent which is liquid at room temperature is generally used.

Examples of such a nonaqueous solvent include alcohols such as methanol, ethanol, isopropanol, butanol and octanol, acid esters such as methyl acetate, ethyl acetate, propyl acetate, butyl acetate, γ-butyrolactone, γ-valerolactone and ε-caprolactone, ketones such as dimethyl ketone, diethyl ketone, methyl ethyl ketone, 3-pentanone and acetone, hydrocarbons such as pentane, hexane, octane, cyclohexane, benzene, toluene, xylene, fluorobenzene and hexafluorobenzene, ethers such as diethyl ether, 1,2-dimethoxyethane, 1,4-dioxane, crown ethers, glymes, tetrahydrofuran and fluoroalkyl ethers, amides such as N,N-dimethylacetamide, N,N-dimethylformamide, ethylenediamine and pyridine, carbonates such as propylene carbonate, ethylene carbonate, vinylene carbonate, fluoroethylene carbonate, diethyl carbonate and ethyl methyl carbonate, nitriles such as acetonitrile, propionitrile, adiponitrile and methoxyacetonitril, lactams such as N-methylpyrrolidone (NMP), sulfones such as sulfolane, sulfoxides such as dimethyl sulfoxide, industrial oils such as silicone oil and petroleum, and edible oil.

As a nonaqueous solvent, ionic liquids may also be used. The ionic liquids refer to a normal temperature molten salt composed of combined ions of organic cations and anions. The ionic liquids have features of flame retardance, low explosibility and almost no vapor pressure. The ionic liquids are expected to be developed to various types of applications because the ionic liquids have a high thermal and ionic conductivities, can be controlled and designed in physical properties by the selection of ion species, and have a selective and high gas absorption power, and the like.

Examples of the organic cation include imidazolium ions such as a dialkylimidazolium cation and a trialkylimidazolium cation, tetraalkylammonium ions, alkylpyridinium ions, dialkylpyrrolidinium ions, and dialkylpiperidinium ions.

Examples of anions usable as counter ions of the organic cations are a $PF_6$ anion, a $PF_3(C_2F_5)_3$ anion, a $PF_3(CF_3)_3$ anion, a $BF_4$ anion, a $BF_2(CF_3)_2$ anion, a $BF_3(CF_3)$ anion, a bisoxalatoborate anion, a Tf (trifluoromethanesulfonyl) anion, a Nf (nonafluorobutanesulfonyl) anion, a bis(fluorosulfonyl)imide anion, a bis(trifluoromethanesulfonyl)imide anion, a bis(pentafluoroethanesulfonyl)imide anion, a dicyanoamine anion and a halide anion.

These nonaqueous solvents are used singly or in combination of two or more.

The gelatinous composition of the present embodiment contains preferably 0.05 to 10.0% by mass of a compound (1), more preferably 0.1 to 5.0% by mass thereof, and still more preferably 0.3 to 3.0% by mass thereof, based on the total amount of the gelatinous composition. The content equal to or higher than the lower limit value described above provides a tendency that the compound (1) fully functions as a gelling agent; and the content equal to or lower than the upper limit value described above provides a tendency of giving more improved economical efficiency and handleability, and can further inhibit the gelling agent from becoming an impurity, and can further prevent the performances of the nonaqueous solvent from decreasing.

The gelatinous composition of the present embodiment contains preferably 80 to 99.95% by mass of a nonaqueous solvent, more preferably 90 to 99.9% by mass thereof, and still more preferably 90 to 99.7% by mass thereof, based on the total amount of the gelatinous composition. The content equal to or higher than the lower limit value described above provides a tendency that the performances of the nonaqueous solvent can further be prevented from decreasing; and the content equal to or lower than the upper limit value described above provides a tendency that the compound (1) more fully functions as a gelling agent.

The gelatinous composition of the present embodiment may contain, in addition to a compound (1) and a nonaqueous solvent, other components in the range of not inhibiting the function of the compound (1) as a gelling agent. Examples of the other components include gelling agents other than the compound (1), coagulants, thickening agents, stabilizers, antioxidants, emulsifiers, lubricants and safety-improving additives.

A preparation method of the gelatinous composition of the present embodiment is not especially limited, but the gelatinous composition can be prepared, for example, by mixing a nonaqueous solvent, a gelling agent (that is, a compound (1)), and other additives under heating to make a homogeneous mixed liquid, and thereafter decreasing the temperature of the mixed liquid. The mixing order of each component is not especially mattered, but if a solution composed of a nonaqueous solvent and additives is prepared in advance and thereafter a gelling agent is mixed, these can make more easily a homogeneous mixed liquid, which is preferable.

Hitherto, the embodiment to carry out the present invention has been described, but the scope of the present invention is not limited to the above-mentioned embodiment. The present invention may be variously changed and modified without departing from the gist.

EXAMPLES

Hereinafter, the present invention will be described further in detail by way of Examples, but the present invention is not limited to these Examples. The various characteristics and the safety of an electrolyte solution for a lithium ion secondary battery, and a lithium ion secondary battery were measured and evaluated as follows.

(i) Evaluation of the Gelling Power of an Electrolyte Solution

An electrolyte solution was prepared in a glass sample bottle, and was left to stand at 25° C. for 2 hours; thereafter, the sample bottle was turned upside down to observe the fluidity to thereby evaluate the gelling power. An electrolyte solution exhibiting no flow was evaluated as "gel"; and by changing the mixing ratio of a nonaqueous solvent and a gelling agent, a minimum concentration of the gelling agent (the concentration of the gelling agent based on the total amount of an electrolyte solution) necessary for gelatinizing the electrolyte solution was determined as a gelling concentration.

(ii) Measurement of the Diffusion Coefficient of an Electrolyte Solution Component The prepared electrolyte solution was introduced in a symmetrical sample tube (5 mmφ, for DMSO), made by Shigemi Inc.; and diffusion coefficients at predetermined temperatures (−20° C., 30° C., 70° C.) of lithium ions and counter anions were evaluated. The evaluation of the diffusion coefficients was carried out by using an ECA400 (trade name, the frequency: 400 MHz) being PFG-NMR, made by JEOL Ltd., and installing a GR probe capable of applying magnetic field-gradient pulses up to 13 T/m. In the magnetic field-gradient NMR spectrometry, if a peak height observed is represented as E; a peak height in the case of no magnetic field-gradient pulses applied, as $E_0$; a nuclear magnetic rotation ratio, as $\gamma(T^{-1} \cdot s^{-1})$; a magnetic field-gradient intensity, as $g(T \cdot m^{-1})$; a time to apply magnetic field-gradient pulses, as $\delta(s)$; a diffusion wait time, $\Delta(s)$; and a self-diffusion coefficient, as $D(m^2 \cdot s^{-1})$, the following expression (17) is satisfied.

$$Ln(E/E_0) = -D \times \gamma^2 \times g^2 \times \delta^2 \times (\Delta - \delta/3) \quad (17)$$

The NMR sequence used the bpp-led-DOSY method. By fixing Δ and δ, and changing g as 15 or more points of g in the range from 0 to $Ln(E/E_0) \leq -3$, a straight line with $Ln(E/E_0)$ taken as the Y axis and $\gamma^2 \times g^2 \times \delta^2 \times (\Delta - \delta/3)$ taken as the X axis was plotted, and D was acquired from the gradient of the straight line. $^7Li$ (lithium ion) and $^{19}F$ (counter anion) were used as measuring nuclei for the measurement. A larger diffusion coefficient is estimated to have a higher diffusion rate.

The lithium ion transport number was calculated from the diffusion coefficient ratio of lithium ions and counter anions.

(iii) Safety Test (Combustion Test) of an Electrolyte Solution

The safety of a battery was evaluated by carrying out the combustion test of an electrolyte solution component. 1 mL of an electrolyte solution whose temperature had been raised to 70° C. was sucked in a glass paper filter of 13 mm×125 mm×2 mm; thereafter, the glass paper filter is cooled to 25° C. to prepare a sample. The sample was set on an "mcm-2" (trade name) being a multi-calorimeter, made by Toyo Seiki Seisaku-sho, Ltd., and subjected to a horizontal combustion test of UL94HB; and after the ignition, the time (lapsed time) required for propagation of flame to the end of the paper filter was measured. A longer time has a larger effect of retarding the combustion, and is estimated to give a higher safety.

(iv) Liquid Retainability Test of an Electrolyte Solution

An electrolyte solution component was fully impregnated in a polypropylene-made nonwoven fabric (porosity: 73%) of 5 cm$^2$×0.012 cm; thereafter, the nonwoven fabric was interposed between two glass sheets to prepare a sample. The sample was placed on a table, and pressurized from one surface (upper surface) thereof by a hydraulic press; and the pressure when liquid leakage started was measured. The masses of the sample before and after the pressurization were measured, and the liquid retention ratio when the sample was pressurized up to 4 kgf/cm$^2$ (about 0.39 MPa), that is, the difference in the mass of the sample before and after the pressurization with respect to the mass of the impregnated electrolyte solution was determined.

(v) Measurement of the Discharge Capacity of a Lithium Ion Secondary Battery

The discharge characteristic of a lithium ion secondary battery was evaluated by measuring the discharge capacity at a specific discharge current. As a lithium ion secondary battery for the measurement, a small-sized battery of 1 C=6 mA was fabricated and used. The measurement was carried out using a charge/discharge tester ACD-01 (trade name), made by Aska Electronic Co., Ltd. and a constant temperature bath PLM-63S (trade name), made by Futaba Kagaku Co., Ltd. The battery was charged at a constant current of 6 mA, and after the voltage reached 4.2 V, the battery was charged at a constant voltage of 4.2 V, for a total charge time of 3 hours. Thereafter, the discharge capacity when the battery was discharged at a constant current down to 3.0 V was measured. The discharge current was set at 6 mA and 18 mA and the discharge capacities were measured. The battery-surrounding temperature at this time was set at 25° C.

(vi) Measurement of the Discharge Capacity of a Laminate-Type Lithium Ion Secondary Battery The discharge capacity was measured as in "(v) Measurement of the discharge capacity of as lithium ion secondary battery" to evaluate the discharge characteristic of a lithium ion secondary battery. As a lithium ion secondary battery for the measurement, a single layer laminate-type battery of 1 C=45.0 mA was fabricated and used. The measurement was carried out using a charge/discharge tester ACD-01 (trade name), made by Aska Electronic Co., Ltd. and a constant temperature bath PLM-63S (trade name), made by Futaba Kagaku Co., Ltd. The battery was charged at a constant current of 9.0 mA, and after the voltage reached 4.2 V, the battery was charged at a constant voltage of 4.2 V, for a total charge time of 8 hours. Thereafter, the discharge capacity when the battery was discharged at a constant current down to 2.75 V was measured. The discharge current was set at 45.0 mA and 135.0 mA and the discharge capacities were measured. The battery-surrounding temperature at this time was set at 25° C.

(vii) Measurement of the Capacity Retention Rate of a Lithium Ion Secondary Battery (Cycle Test)

The measurement of the capacity retention rate was carried out using a charge/discharge tester ACD-01 (trade name), made by Aska Electronic Co., Ltd. and a constant temperature bath PLM-63S (trade name), made by Futaba Kagaku Co., Ltd. As a lithium ion secondary battery for the measurement, a battery was fabricated as in "(v) Measurement of the discharge capacity of as lithium ion secondary battery", and used. In the charge/discharge cycle test, the battery was first charged at a constant current of 6 mA, and after the voltage reached 4.2 V, the battery was charged at a constant voltage of 4.2 V, for a total charge time of 3 hours. Thereafter, the battery was discharged at a constant current of 6 mA, and at the time when the voltage reached 3.0 V, charging was again repeated. Carrying out charging and discharging each one time was defined as 1 cycle, and charging/discharging of 100 cycles was carried out. With the discharge capacity at 1 cycle set as 100%, the discharge capacity at 100 cycles was defined as a capacity retention rate. The battery-surrounding temperature was set at 25° C.

(viii) Measurement of the Discharge Capacity at a Low Temperature of a Lithium Ion Secondary Battery The battery-surrounding temperature was set at −20° C., −10° C. and 0° C., and the respective discharge capacities were measured as in "(v) Measurement of the discharge capacity of as lithium ion secondary battery". The discharge capacity was measured at a discharge current of 3 mA.

(ix) Durability Test at a High Temperature of a Lithium Ion Secondary Battery

The battery-surrounding temperature was set at 60° C., and the charge/discharge cycle test was carried out up to 50 cycles as in "(vii) Measurement of the capacity retention rate of a lithium ion secondary battery (cycle test)", and the capacity retention rate at a high temperature was measured.

(x) Test of Lithium Deposition of a Lithium Ion Secondary Battery

The lithium deposition test was carried out using a single layer laminate-type battery fabricated as in "(vi) Measurement of the discharge capacity of a laminate-type lithium ion secondary battery". The battery charged at a constant current of 9.0 mA up to 4.2 V was discharged at 9.0 mA down to 3.0 V; and the battery was further charged at a constant current of 45 mA for 1.5 hours. The charged battery was dismantled under the atmosphere of a dew point of −60° C. or lower and a moisture concentration of 10 ppm or less. The negative electrode surface of the dismantled battery was observed by an optical microscope of a magnification of 2,000×, and the lithium deposition behavior was evaluated under the following standard.

A: No deposition of lithium was observed.

B: Deposition of lithium was observed, but the surface of the deposit was smooth.

C: Deposition of lithium was observed, and sharp dendrite was observed on the surface of the deposit.

The deposition of dendrite causes battery short circuit, and causes a decrease in the battery safety.

Example 1-1

(1) Preparation of an Electrolyte Solution

Ethylene carbonate and methyl ethyl carbonate were mixed in a volume ratio of 1:2; LiPF$_6$ was added to the mixed solution so that the concentration became 1 mol/L to fabricate an ungelatinized electrolyte solution (A) (hereinafter, an electrolyte solution before addition of a gelling agent is referred to as "base electrolyte solution"). A compound represented by the formula (8) shown below (referred to also as a compound (8); the same applies hereinafter) was added as a gelling agent to the base electrolyte solution (A), heated at 70° C. and homogeneously mixed, and the mixture was thereafter cooled to 25° C. to obtain an electrolyte solution (a). When the gelling agent was added gradually from a small amount thereof to the base electrolyte solution, since the electrolyte solution was fully gelatinized when the addition amount of the gelling agent reached 0.3% by mass of the total amount of the electrolyte solution, the addition of the gelling agent was stopped. That is, the content of the gelling agent to the total amount of the electrolyte solution (a) was 0.3% by mass.

[Formula 5]

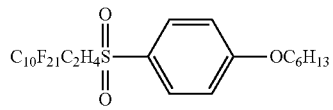

(8)

The compound (8) was synthesized according to the synthesis methods described in WO 2009/78268. The structure was identified using $^1$H-NMR (CDCl$_3$) and $^{19}$F-NMR (CDCl$_3$). The results were as follows.

$^1$H-NMR (CDCl$_3$) 0.91 (3H, m), 1.35 (6H, m), 1.82 (2H, m), 2.57 (2H, m), 3.29 (2H, m), 4.04 (2H, m), 7.04 (2H, d, J=8.0 Hz), 7.83 (2H, d, J=8.0 Hz) ppm $^{19}$F-NMR (CDCl$_3$) −126.54 (2F, m), −123.57 (2F, m), −123.13 (2F, m), −122.16 (10F, m), −113.99 (2F, m), −81.20 (3F, m) ppm Example 1-2

An electrolyte solution (b) was obtained as in Example 1-1, except for using a base electrolyte solution (B) fabricated by mixing ethylene carbonate, propylene carbonate and γ-butyrolactone in a volume ratio of 1:1:2, and adding LiBF$_4$ to the mixed solution so that the concentration became 1.5 mol/L, in place of the base electrolyte solution (A).

Examples 1-3 to 1-8, 1-10 and 1-11

Electrolyte solutions (c), (d), (e), (f), (g), (h), (j) and (k) were obtained as in Example 1-1, except for using, as a gelling agent, a corresponding one of compounds represented by the formulae (9), (10) (11), (12), (13), (14), (15) and (16) shown below, in place of the compound represented by the formula (8) shown above.

[Formula 6]

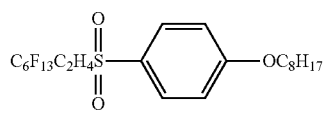

(9)

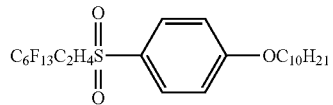

(10)

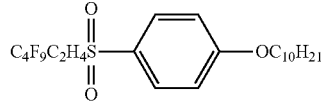

(11)

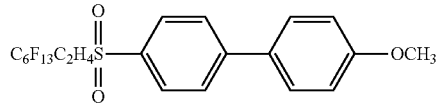

(12)

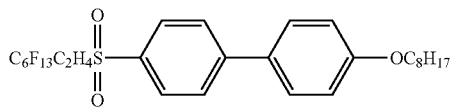

(13)

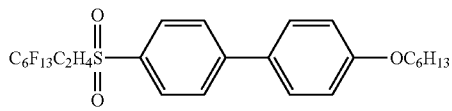

(14)

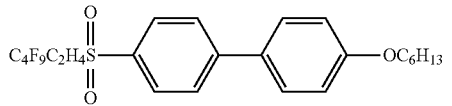

(15)

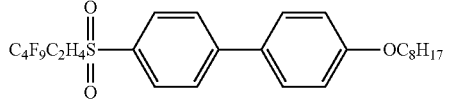

(16)

The compounds (9), (10) and (11) were synthesized according to the synthesis methods described in WO 2009/78268. The structures were identified using $^1$H-NMR (CDCl$_3$) and $^{19}$F-NMR (CDCl$_3$). The results were as follows.

[Compound (9)]

$^1$H-NMR (CDCl$_3$) 0.89 (3H, m), 1.32 (10H, m), 1.82 (2H, m), 2.57 (2H, m), 3.29 (2H, m), 4.04 (2H, m), 7.04 (2H, d, J=8.0 Hz), 7.83 (2H, d, J=8.0 Hz) ppm $^{19}$F-NMR (CDCl$_3$) −126.58 (2F, m), −123.49 (4F, m), −122.36 (2F, m), −114.01 (2F, m), −81.26 (3F, m) ppm

[Compound (10)]

$^1$H-NMR (CDCl$_3$) 0.88 (3H, m), 1.27 (14H, m), 1.81 (2H, m), 2.57 (2H, m), 3.29 (2H, m), 4.04 (2H, m), 7.03 (2H, d, J=8.0 Hz), 7.83 (2H, d, J=8.0 Hz) ppm $^{19}$F-NMR (CDCl$_3$) −126.61 (2F, m), −123.63 (2F, m), −123.33 (2F, m), −122.36 (2F, m), −114.00 (2F, m), −81.24 (3F, m) ppm

[Compound (II)]

$^1$H-NMR (CDCl$_3$) 0.88 (3H, m), 1.28 (14H, m), 1.82 (2H, m), 2.56 (2H, m), 3.29 (2H, m), 4.04 (2H, m), 7.04 (2H, d, J=8.0 Hz), 7.83 (2H, d, J=8.0 Hz) ppm $^{19}$F-NMR (CDCl$_3$) −126.50 (2F, m), −124.58 (2F, m), −114.26 (2F, m), −81.47 (3F, m) ppm The compound (12) was synthesized as follows.

A compound (a) was prepared according to the following scheme. Specifically, 4.88 g (4.82×10$^{-2}$ mol) of triethylamine was added to a 100-mL dry tetrahydrofuran (dry THF) solution of 15.04 g (3.17×10$^{-2}$ mol) of 2-(perfluorohexyl)ethyl iodide and 5.97 g (3.16×10$^{-2}$ mol) of p-bromothiophenol in a 200-mL round-bottomed flask, and the solution was refluxed in an oil bath at 84° C. for 20 hours. After the temperature of the solution was returned to room temperature, since a solid was observed in the solution, the solid was removed by suction filtration.

After the filtrate was transferred to a 300-mL separating funnel, cyclopentyl methyl ether was added, and an organic phase was washed twice with water, and anhydrous magnesium sulfate was added to the organic phase to dry the organic phase. The anhydrous magnesium sulfate was removed by filtration. An obtained filtrate was concentrated under reduced pressure, and a residue was recrystallized with ethanol. As a result, 12.36 g of a compound (a) was obtained (yield: 73%, melting point: 39 to 41° C.). The structure of the compound (a) was identified by $^1$H-NMR.

[Formula 7]

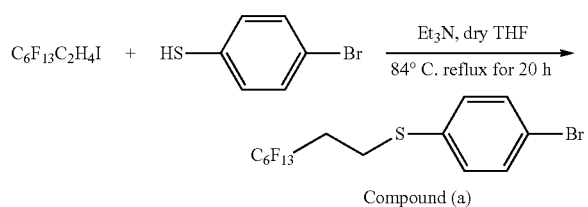

Then, a compound (b) was obtained according to the following scheme. Specifically, 2.75 g ($2.83 \times 10^{-2}$ mol) of a 35% hydrogen peroxide solution was added to a 50-mL glacial acetic acid solution of 5.01 g ($9.36 \times 10^{-3}$ mol) of the compound (a) in a 300-mL round-bottomed flask, and stirred in an oil bath at 70° C. for 89 hours. After the temperature of the solution was returned to room temperature, 5 mL of a 20% sodium hydrogensulfite aqueous solution was added to reduce unreacted hydrogen peroxide. At this time, although a solid already deposited in the solution, when 90 mL of water was added, a solid further deposited. After suction filtration, the solid was washed with water. As a result, 4.74 g of a compound (b) was obtained (yield: 89%, melting point: 127 to 129° C.). The structure of the compound (b) was identified by $^1$H-NMR.

[Formula 8]

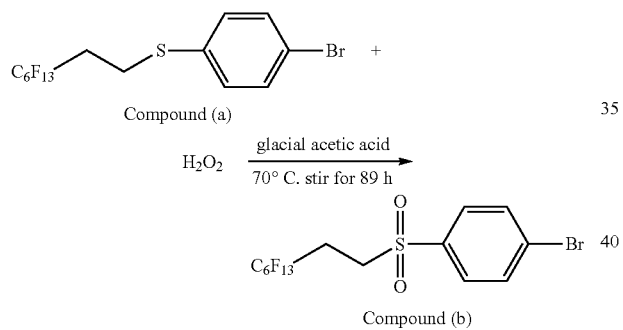

Then, a compound (f), that is, the compound (12), was obtained according to the following scheme. Specifically, 0.60 g ($3.95 \times 10^{-3}$ mol) of 4-methoxyphenyl borate, 2.24 g ($3.95 \times 10^{-3}$ mol) of the compound (b), 30 mL of a 2M sodium carbonate aqueous solution, and 40 ml of 1,4-dioxane (an amount added until the solid was dissolved) were added in a 100-mL round-bottomed flask. After 0.13 g ($5.80 \times 10^{-4}$ mol) of palladium diacetate and 0.63 g ($2.36 \times 10^{-3}$ mol) of triphenylphosphine were added thereto, a Dimroth tube was attached to the round-bottomed flask, and the mixture was vigorously stirred in a $N_2$ atmosphere at 95° C. for 2.5 hours. After the mixture was cooled to room temperature, 50 mL of water was added to the mixture, which was then stirred at room temperature for 2.5 hours. After the mixture was transferred to a 300-mL separating funnel, 80 mL of ethyl acetate an organic solvent was added, and a water phase was removed. The water phase was extracted twice with 50 mL of ethyl acetate. These organic phases were combined, and washed once with 120 mL of a saturated sodium hydrogencarbonate aqueous solution, and twice with saturated brine. After the organic phase was transferred to a 200-mL conical flask, 0.2 g of active carbon was added to the organic phase, which was then stirred at room temperature for 30 min. Sodium sulfate was further added and stirred at room temperature for 1 hour.

Celite was spread to a depth of 1 cm in a Nutsche, and a solid was removed by suction filtration using the Nutsche. After a filtrate was transferred to a 200-mL round-bottomed flask, the filtrate was concentrated under reduced pressure to obtain a solid (c) (the amount of the solid (c): 2.18 g). 20 mL of petroleum ether and 30 mL of methanol were added to the solid (c), but since the solid was not completely dissolved, the mixture was suction-filtrated to make a filtrate and a solid (d) (the amount of the solid (d): 1.24 g). The filtrate was concentrated under reduced pressure to make a solid (e) (the amount of the solid (e): 0.78 g). As a result of the measurement of $^1$H-NMR spectra of the solids (d) and (e), the main component of the solid (d) was found to be a target material. Since black microcrystals were observed in the solution when the solid (d) was dissolved in chloroform, the solution was taken by a glass injection syringe, and the microcrystals were removed through a cylinder filter (pore diameter: 0.45 μm, diameter: 13 mm). The solution passed through the filter was concentrated under reduced pressure, and the recrystallization was carried out with chloroform. In order to raise the yield, the filtrate after the recrystallization was concentrated under reduced pressure, and the recrystallization was twice carried out with chloroform and with ethanol. As a result of the recrystallizations of 3 times in total, 0.87 g of a compound (f) was obtained (yield: 37%, melting point: 187 to 189° C.). The structure of the obtained compound (f) was identified by $^1$H-NMR (CDCl$_3$) and $^{19}$F-NMR (CDCl$_3$). The results were as follows.

$^1$H-NMR (CDCl$_3$) 2.63 (2H, m), 3.36 (2H, m), 3.88 (3H, s), 7.03 (2H, d, J=8.5 Hz), 7.58 (2H, d, J=8.5 Hz), 7.77 (2H, d, J=8.5 Hz) 7.97 (2H, d, J=8.5 Hz) ppm $^{19}$F-NMR (CDCl$_3$) −126.60 (2F, m), −123.60 (2F, m), −123.34 (2F, m), −122.35 (2F, m), −114.02 (2F, m), −81.25 (3F, m) ppm

[Formula 9]

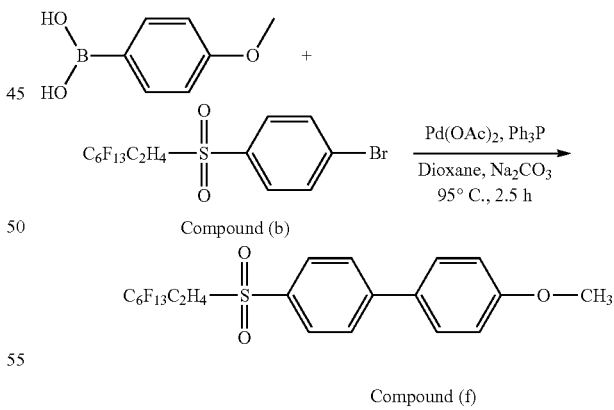

The compound (14) was synthesized as follows. The compound (13), the compound (15) and the compound (16) also were synthesized according to the synthesis method of the compound (14).

First, a compound (a) was obtained according to the following scheme. Specifically, 11.34 g (60 mmol) of p-bromothiophenol was charged in a 200-mL round-bottomed flask in a nitrogen atmosphere, and 70 mL of DME was added thereto. 29.86 g (63 mmol) of 2-(perfluorohexyl)ethyl iodide and 12.42 g (90 mmol) of $K_2CO_3$ were further charged, and the mixture was heated at 50° C. and stirred for 3 hours. After the temperature of the mixture was returned to room temperature, a solid remaining in the mixture was removed by suction filtration. A filtrate after the removal of the solid was concentrated under reduced pressure. A high-viscosity oily material was obtained by the concentration, and then, the oily material was vacuum-dried at 50° C., and the remaining solvent and unreacted materials were distilled out. As a result, 32.82 g of a compound (a) was obtained. The structure of the compound (a) was identified by $^1$H-NMR ($CDCl_3$).

[Formula 10]

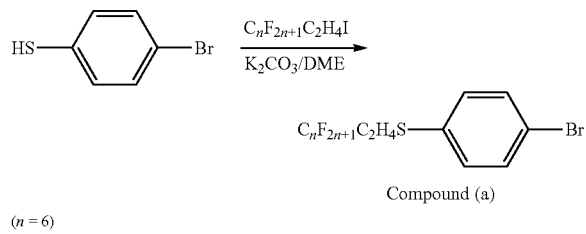

Compound (a)

($n = 6$)

Then, a compound (b) was obtained according to the following scheme. Specifically, 26 mL (300 mmol) of a 35% hydrogen peroxide solution was added to a 100-mL glacial acetic acid solution of 32.82 g of the compound (a) in a 200-mL round-bottomed flask under a nitrogen atmosphere, and the mixture was stirred in an oil bath at 70° C. for 2 hours. After water was added thereto, a white solid produced was filtered by suction filtration; water was added to wash the solid twice; and hexane was further added to once wash the solid. The solid was further dried under reduced pressure at 90° C. to obtain 26.34 g of a compound (b) (yield: 75%). The structure of the compound (b) was identified by $^1$H-NMR ($CDCl_3$).

[Formula 11]

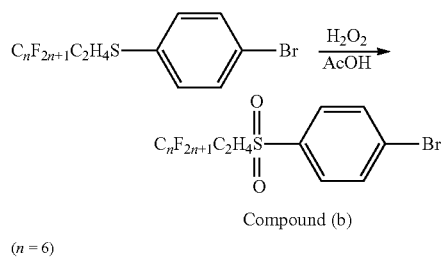

Compound (b)

($n = 6$)

Then, a compound (j) was obtained according to the following scheme. Specifically, 4.4 g (20 mmol) of a compound (i) shown below and 70 mL of 3-pentanone were charged in a 200-mL round-bottomed flask in a nitrogen atmosphere, and stirred at room temperature, and thereafter 4.13 g (25 mmol) of $C_6H_{13}Br$ and 4.14 g (30 mmol) of $K_2CO_3$ were further added thereto, and refluxed in an oil bath at 120° C. for 11 hours. After the temperature of the mixture was returned to room temperature, a solid remaining therein was removed by suction filtration. A filtrate after the removal of the solid was concentrated under reduced pressure to thereby obtain a brown oily material, and then, the oily material was vacuum-dried at 80° C. to quantitatively obtain 6.87 g of a solid compound (j). The structure of the compound (j) was identified by $^1$H-NMR ($CDCl_3$).

[Formula 12]

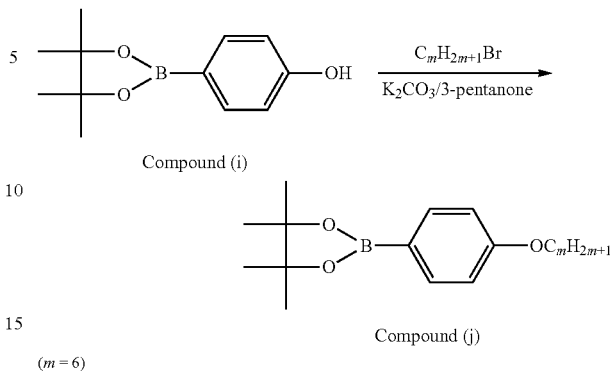

($m = 6$)

Then, a compound (k), that is, the compound (14), was obtained according to the following scheme. Specifically, 2.0 g (6.58 mmol) of the compound (j), 3.7 g (6.58 mmol) of the compound (b), 60 ml of 1,4-dioxane, 0.295 g (1.31 mmol) of palladium diacetate, 1.18 g (4.5 mmol) of triphenylphosphine, and a 2M sodium carbonate aqueous solution (in which 7g of sodium carbonate was dissolved in 30 mL of water) were charged in a 200-mL round-bottomed flask. Then, a Dimroth tube was attached to the round-bottomed flask, and the mixture was heated and held at 95° C. for 120 min in a nitrogen atmosphere. Thereafter, the mixture was cooled to room temperature, and the separation into an upper phase (gelatinous) and a lower phase (liquid) was made sure of; and ethanol was added thereto in order to azeotropically boil water, and the solvent was thereafter distilled out by an evaporator. After ethyl acetate was added to the round-bottomed flask after the solvent had been distilled out, and the content was heated at 70° C. to be dissolved, the ethyl acetate was filtered under the heating state. Then, a vessel containing an obtained filtrate was cooled to room temperature for the filtrate to be again gelatinized. Then, the obtained gelatinous material was washed three times with hexane until the supernatant solution became transparent. A solid obtained by filtering the washed gelatinous material was dried at 70° C. under reduced pressure to obtain 2.38 g of a compound (k) (a white solid).

[Formula 13]

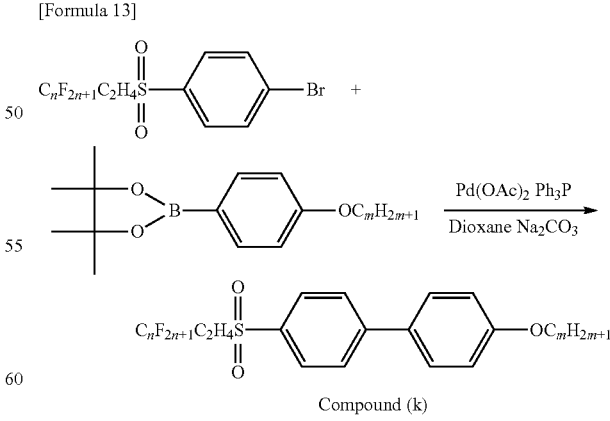

($n, m = 6$)

The structure of the obtained compound (k), that is, the compound (14), was identified by $^1$H-NMR ($CDCl_3$) and $^{19}$F-NMR ($CDCl_3$). The results were as follows.

$^1$H-NMR (CDCl$_3$) 0.92 (3H, m), 1.36 (6H, m), 1.81 (2H, m), 2.65 (2H, m), 3.35 (2H, m), 4.02 (2H, m), 7.01 (2H, d, J=8.0 Hz), 7.56 (2H, d, J=8.0 Hz), 7.77 (2H, d, J=8.0 Hz), 7.95 (2H, d, J=8.0 Hz) ppm $^{19}$F-NMR (CDCl$_3$) −126.62 (2F, m), −123.60 (2F, m), −123.35 (2F, m), −122.36 (2F, m), −114.01 (2F, m), −81.25 (3F, m) ppm The structures of the compound (13), the compound (15) and the compound (16) also were similarly identified by $^1$H-NMR (CDCl$_3$) and $^{19}$F-NMR (CDCl$_3$). The results were as follows.

[Compound (13)]

$^1$H-NMR (CDCl$_3$) 0.90 (3H, m), 1.31 (10H, m), 1.83 (2H, m), 2.67 (2H, m), 3.37 (2H, m), 4.03 (2H, m), 7.01 (2H, d, J=8.0 Hz), 7.58 (2H, d, J=8.0 Hz), 7.78 (2H, d, J=8.0 Hz), 7.97 (2H, d, J=8.0 Hz) ppm $^{19}$F-NMR (CDCl$_3$) −126.62 (2F, m), −123.60 (2F, m), −123.34 (2F, m), −122.36 (2F, m), −114.01 (2F, m), −81.25 (3F, m) ppm

[Compound (15)]

$^1$H-NMR (CDCl$_3$) 0.92 (3H, m), 1.35 (6H, m), 1.80 (2H, m), 2.63 (2H, m), 3.35 (2H, m), 4.02 (2H, m), 7.01 (2H, d, J=8.0 Hz), 7.56 (2H, d, J=8.0 Hz), 7.77 (2H, d, J=8.0 Hz), 7.95 (2H, d, J=8.0 Hz) ppm $^{19}$F-NMR (CDCl$_3$) −126.62 (2F, m), −124.50 (2F, m), −114.21 (2F, m), −81.45 (3F, m) ppm

[Compound (16)]

$^1$H-NMR (CDCl$_3$) 0.89 (3H, m), 1.35 (10H, m), 1.81 (2H, m), 2.65 (2H, m), 3.35 (2H, m), 4.01 (2H, m), 7.01 (2H, d, J=8.0 Hz), 7.56 (2H, d, J=8.0 Hz), 7.77 (2H, d, J=8.0 Hz), 7.95 (2H, d, J=8.0 Hz) ppm $^{19}$F-NMR (CDCl$_3$) −126.50 (2F, m), −124.56 (2F, m), −124.24 (2F, m), −81.46 (3F, m) ppm Example 1-9

An electrolyte solution (i) was obtained as in Example 1-2, except for using, as a gelling agent, a compound represented by the formula (14) shown above, in place of the compound represented by the formula (8) shown above.

For the electrolyte solutions of Examples 1-1 to 1-11, the evaluation described in the above-mentioned "(i) Evaluation of the gelling power of an electrolyte solution" was carried out. The results are shown in Table 1.

TABLE 1

| | Examples | | | | | | | | | | |
|---|---|---|---|---|---|---|---|---|---|---|---|
| | 1-1 | 1-2 | 1-3 | 1-4 | 1-5 | 1-6 | 1-7 | 1-8 | 1-9 | 1-10 | 1-11 |
| Electrolyte solution | (a) | (b) | (c) | (d) | (e) | (f) | (g) | (h) | (i) | (j) | (k) |
| Gelling agent | (8) | (8) | (9) | (10) | (11) | (12) | (13) | (14) | (14) | (15) | (16) |
| Base electrolyte solution | (A) | (B) | (A) | (A) | (A) | (A) | (A) | (A) | (B) | (A) | (A) |
| Gelling concentration (mass %) | 0.3 | 0.5 | 3.0 | 3.0 | 3.0 | 1.0 | 0.5 | 0.3 | 0.5 | 0.5 | 0.5 |

Examples 1-12 to 1-16

Electrolyte solutions (l), (n), (O), (p) and (q) were prepared as in Example 1-1, except for adding a corresponding one of gelling agents represented by the formulae (8), (9), (11), (14) and (16) shown above in a corresponding addition amount (based on the total amount of the electrolyte solution) indicated in Table 2, to the base electrolyte solution (A). For the electrolyte solutions, the measurement described in the above-mentioned "(ii) Measurement of the diffusion coefficient of an electrolyte solution component" was carried out. The results are shown in Table 2.

TABLE 2

| | | | Example 1-12 | Example 1-13 | Example 1-14 | Example 1-15 | Example 1-16 | Example 2-1 |
|---|---|---|---|---|---|---|---|---|
| | | Electrolyte solution | (l) | (n) | (o) | (p) | (q) | (A) |
| | | Gelling agent | (8) | (9) | (11) | (14) | (16) | — |
| | | Addition amount of gelling agent (mass %) | 1.0 | 3.0 | 3.0 | 1.0 | 1.0 | — |
| | | Base electrolyte solution | (A) | | | | | |
| Measurement temperature | −20° C. | Diffusion coefficient of Li$^+$ (×10$^{−11}$) | 4.16 | 3.67 | 4.00 | 3.94 | 4.00 | 4.83 |
| | | Diffusion coefficient of anion (×10$^{−11}$) | 6.10 | 5.87 | 6.15 | 6.18 | 6.15 | 7.57 |
| | | Transportation number of Li$^+$ | 0.41 | 0.38 | 0.39 | 0.39 | 0.39 | 0.45 |

TABLE 2-continued

|  |  | Example 1-12 | Example 1-13 | Example 1-14 | Example 1-15 | Example 1-16 | Example 2-1 |
|---|---|---|---|---|---|---|---|
| 30° C. | Diffusion coefficient of Li$^+$ ($\times 10^{-10}$) | 1.79 | 2.06 | 2.04 | 2.05 | 2.04 | 1.98 |
|  | Diffusion coefficient of anion ($\times 10^{-10}$) | 3.02 | 3.01 | 2.86 | 2.94 | 2.86 | 3.12 |
|  | Transportation number of Li$^+$ | 0.37 | 0.41 | 0.42 | 0.41 | 0.42 | 0.39 |
| 70° C. | Diffusion coefficient of Li$^+$ ($\times 10^{-10}$) | 5.77 | 5.01 | 7.20 | 5.76 | 7.20 | 7.89 |
|  | Diffusion coefficient of anion ($\times 10^{-10}$) | 7.81 | 6.60 | 9.16 | 7.08 | 9.16 | 9.77 |
|  | Transportation number of Li$^+$ | 0.43 | 0.43 | 0.44 | 0.45 | 0.44 | 0.45 |

Example 2-1

The base electrolyte solution (A) was used as it was, as an electrolyte solution. For the electrolyte solution, the measurement described in the above-mentioned "(ii) Measurement of the diffusion coefficient of an electrolyte solution component" was carried out. The results are shown in Table 2.

Example 1-17

An electrolyte solution (r) was prepared as in Example 1-2, except for adding the gelling agent represented by the formula (14) shown above in an addition amount (based on the total amount of the electrolyte solution) indicated in Table 3, to the base electrolyte solution (B). For the electrolyte solutions, the measurement described in the above-mentioned "(ii) Measurement of the diffusion coefficient of an electrolyte solution component" was carried out only at 30° C. The results are shown in Table 3.

Example 2-2

The base electrolyte solution (B) was used as it was, as an electrolyte solution. For the electrolyte solution, the measurement described in the above-mentioned "(ii) Measurement of the diffusion coefficient of an electrolyte solution component" was carried out only at 30° C. The results are shown in Table 3.

Example 2-3

20% by mass of a polyurethane synthesized from a diol compound having a number-average molecular weight (measured by the GPC method) of 1,000 and an OH value of 110 mgKOH/g, and an isocyanate was added (based on the total amount of the electrolyte solution) to and sucked in the base electrolyte solution (B) to obtain a polyurethane gel electrolyte (s). For the electrolyte solution component of the electrolyte (s), the measurement described in the above-mentioned "(ii) Measurement of the diffusion coefficient of an electrolyte solution component" was carried out only at 30° C. The results are shown in Table 3.

Examples 1-18 to 1-23, and Example 2-4

An electrolyte solution (m) was prepared as in Example 1-1, except for adding 3.0% by mass of the gelling agent represented by the formula (8) shown above, based on the total amount of the electrolyte solution, to the base electrolyte solution (A). For the electrolyte solutions (l), (m), (n), (o), (p) and (q), and the base electrolyte solution (A), the test described in the above-mentioned "(iii) Safety test (combustion test) of an electrolyte solution" was carried out. The results are shown in Table 4.

TABLE 3

|  |  | Example 1-17 | Example 2-2 | Example 2-3 |
|---|---|---|---|---|
| Electrolyte solution (Electrolyte) |  | (r) | (B) | (s) |
| Gelling agent |  | (14) | — | polyurethane |
| Addition amount of gelling agent (mass %) |  | 1.0 | — | 20 |
| Base electrolyte solution |  |  | (B) |  |
| Measurement temperature | 30° C. Diffusion coefficient of Li$^+$ ($\times 10^{-10}$) | 1.06 | 1.15 | 0.34 |
|  | Diffusion coefficient of anion ($\times 10^{-10}$) | 1.38 | 1.53 | 0.61 |
|  | Transportation number of Li$^+$ | 0.43 | 0.43 | 0.35 |

TABLE 4

|  | Example 1-18 | Example 1-19 | Example 1-20 | Example 1-21 | Example 1-22 | Example 1-23 | Example 2-4 |
|---|---|---|---|---|---|---|---|
| Electrolyte solution | (l) | (m) | (n) | (o) | (p) | (q) | (A) |
| Gelling agent | (8) | (8) | (9) | (11) | (14) | (16) | — |
| Lapsed time (s) | 28.9 | 45.9 | 10.2 | 15.5 | 23.2 | 20.1 | 1.7 |

Example 1-24 and Example 2-5

For the electrolyte solution (m) and the base electrolyte solution (A), the test described in the above-mentioned "(iv) Liquid retainability test of an electrolyte solution" was carried out. The results are shown in Table 5.

TABLE 5

|  | Example 1-24 | Example 2-5 |
|---|---|---|
| Electrolyte solution | (m) | (A) |
| Liquid leakage starting pressure (kgf/cm) | 2.0 | <0.2 |
| Liquid retention rate (%) | 73.6 | 39.7 |

Example 1-25

Fabrication of a Positive Electrode

Lithium cobaltate ($LiCoO_2$) having a number-average particle diameter of 5 μm as a positive electrode active substance, a graphite carbon powder having a number-average particle diameter of 3 μm as a conductive aid, and a polyvinylidene fluoride (PVdF) as a binder were mixed in a mass ratio of 85:10:5. N-methyl-2-pyrrolidone was charged in the obtained mixture so that the solid content became 60% by mass, and further mixed to prepare a slurry-like solution. The slurry-like solution was applied on one surface of an aluminum foil having a thickness of 20 μm; and after the solvent was dried and removed, the resultant was rolled by a roll press.

The resultant after the rolling was punched into a circular disc shape of 16 mm in diameter to obtain a positive electrode (α).

<Fabrication of a Negative Electrode>

A mesocarbon microbead having a number-average particle diameter of 5 μm as a negative electrode active substance, and a dienic rubber (the glass transition temperature: −5° C., the number-average particle diameter at a dry condition: 120 nm, the disperse medium: water, and the solid content concentration: 40% by mass) as a binder were mixed so that the solid content concentration of the negative electrode active substance became 60% by mass while the viscosity of the mixture was being regulated with a carboxymethyl cellulose, to prepare a slurry-like solution. The slurry-like solution was applied on one surface of a copper foil having a thickness of 10 μm; and after the solvent was dried and removed, the resultant was rolled by a roll press. The resultant after the rolling was punched into a circular disk shape of 16 mm in diameter to obtain a negative electrode (β).

<Assembling of a Battery>

A laminate, in which the positive electrode (α) and the negative electrode (β) fabricated as described above were overlaid on both sides of a separator (the membrane thickness: 25 μm, the porosity: 50%, and the pore diameter: 0.1 μm to 1 μm) composed of a polyethylene, was inserted in a SUS-made circular disk-type battery case. Then, 0.5 mL of the electrolyte solution (I) heated at 70° C. was injected in the battery case to immerse the laminate in the electrolyte solution (I), and thereafter, the battery case was closed to fabricate a lithium ion secondary battery (small-sized battery). The lithium ion secondary battery was held at 70° C. for 1 hour, and then cooled to 25° C. to obtain a battery (l1).

Example 1-26 and Example 2-6

Batteries (m1) and (A1) were obtained as in Example 1-25, except for using the electrolyte solutions (m) and (A), respectively, in place of the electrolyte solution (I).

Example 1-27

Fabrication of a Positive Electrode

A mixed oxide of lithium with nickel, manganese and cobalt having a number-average particle diameter of 11 μm as a positive electrode active substance, a graphite carbon powder having a number-average particle diameter of 6.5 μm and an acetylene black powder having a number-average particle diameter of 48 μm as conductive aids, and a polyvinylidene fluoride (PVdF) as a binder were mixed in a mass ratio of 100:4.2:1.8:4.6. N-methyl-2-pyrrolidone was charged in the obtained mixture so that the solid content became 68% by mass, and further mixed to prepare a slurry-like solution. The slurry-like solution was applied on one surface of an aluminum foil having a thickness of 20 μm; and after the solvent was dried and removed, the resultant was rolled by a roll press. The resultant after the rolling was punched into a circular disc shape of 16 mm in diameter to obtain a positive electrode (γ).

<Fabrication of a Negative Electrode>

A graphite carbon powder having a number-average particle diameter of 12.7 μm and a graphite carbon powder having a number-average particle diameter of 6.5 μm as negative electrode active substances, and a carboxymethyl cellulose solution (the solid content concentration: 1.83% by mass) and a dienic rubber (the glass transition temperature: −5° C., the number-average particle diameter at a dry condition: 120 nm, the disperse medium: water, and the solid content concentration: 40% by mass) as binders were mixed in a solid content mass ratio of 90:10:1.44:1.76 so that the solid content concentration of the whole became 45% by mass, to prepare a slurry-like solution. The slurry-like solution was applied on one surface of a copper foil having a thickness of 10 μm; and after the solvent was dried and removed, the resultant was rolled by a roll press. The resultant after the rolling was punched into a circular disk shape of 16 mm in diameter to obtain a negative electrode (δ).

<Assembling of a Battery>

A laminate, in which the positive electrode (γ) and the negative electrode (δ) fabricated as described above were overlaid on both sides of a separator (the membrane thickness: 25 μm, the porosity: 50%, and the pore diameter: 0.1 μm to 1 μm) composed of a polyethylene, was inserted in a SUS-made circular disk-type battery case. Then, 0.5 mL of the electrolyte solution (I) heated at 70° C. was injected in the battery case to immerse the laminate in the electrolyte solution (I), and thereafter, the battery case was closed to fabricate a lithium ion secondary battery (small-sized battery). The lithium ion secondary battery was held at 70° C. for 1 hour, and then cooled to 25° C. to obtain a battery (l2).

Examples 1-28 to 1-31, and Example 2-7

Batteries (n), (o), (p), (q) and (A2) were obtained as in Example 1-27, except for using a corresponding one of the electrolyte solutions (n), (o), (p) and (q) and the base electrolyte solution (A), in place of the electrolyte solution (I).

For the batteries (l1), (m1), (l2), (n), (o), (p), (q), (A1) and (A2) of Examples 1-25 to 1-31 and Examples 2-6 and 2-7, the measurement described in the above-mentioned "(v) Measurement of the discharge capacity of a lithium ion secondary battery" was carried out. The results are shown in Table 6.

TABLE 6

|  | Ex. 1-25 | Ex. 1-26 | Ex. 1-27 | Ex. 1-28 | Ex. 1-29 | Ex. 1-30 | Ex. 1-31 | Ex. 2-6 | Ex. 2-7 |
|---|---|---|---|---|---|---|---|---|---|
| Electrolyte solution | (l) | (m) | (l) | (n) | (o) | (p) | (q) | (A) | (A) |
| Electrode (Positive electrode/ Negative electrode) | (α)/(β) |  |  |  | (γ)/(δ) |  |  | (α)/(β) | (γ)/(δ) |
| Battery | (l1) | (m1) | (l2) | (n) | (o) | (p) | (q) | (A1) | (A2) |
| Discharge capacity (mAh) 6 mA | 6.78 | 6.68 | 5.84 | 5.87 | 5.86 | 5.91 | 5.90 | 6.81 | 5.86 |
| 18 mA | 3.19 | 2.89 | 3.24 | 2.81 | 2.81 | 3.23 | 3.18 | 2.89 | 26.3 |
| Capacity retention rate (%) | 98 | 97 | 96 | 91 | 94 | 96 | 96 | 98 | 92 |

For the batteries (l1), (m1), (l2), (p), (A1) and (A2) of Examples 1-25 to 1-27 and 1-30 and Comparative Examples 2-6 and 2-7, the measurement described in the above-mentioned "(viii) Measurement of the discharge capacity at a low temperature of a lithium ion secondary battery" was carried out. The results are shown in Table 7. Any of the batteries could execute low-temperature discharge, and no decrease in the low-temperature characteristics due to the gelling agent was observed.

TABLE 7

|  |  | Example 1-25 | Example 1-26 | Example 2-6 | Example 1-27 | Example 1-30 | Example 2-7 |
|---|---|---|---|---|---|---|---|
| Electrolyte solution |  | (l) | (m) | (A) | (l) | (p) | (A) |
| Electrode (Positive electrode/Negative electrode) |  |  | (α)/(β) |  |  | (γ)/(δ) |  |
| Battery |  | (l1) | (m1) | (A1) | (l2) | (p) | (A2) |
| Discharge capacity (mAh) | −20° C. | 3.52 | 3.34 | 3.83 | 2.77 | 2.87 | 3.04 |
|  | −10° C. | 6.32 | 6.00 | 6.37 | 4.06 | 4.08 | 4.07 |
|  | 0° C. | 6.68 | 6.41 | 6.70 | 4.29 | 4.36 | 4.33 |

For the batteries (l1), (m1) and (A1) of Examples 1-25 and 1-26 and Example 2-6, the test described in the above-mentioned "(ix) Durability test at a high temperature of a lithium ion secondary battery" was carried out. The results are shown in Table 8. Any of the batteries exhibited a favorable capacity retention rate after the charge/discharge cycle test, and no acceleration of deterioration due to the gelling agent was observed.

TABLE 8

|  | Example 1-25 | Example 1-26 | Example 2-6 |
|---|---|---|---|
| Battery | (l1) | (m1) | (A1) |
| Capacity retention rate (%) | 97.3 | 96.8 | 98.0 |

Example 1-32

Fabrication of a Positive Electrode

Lithium cobaltate ($LiCoO_2$) as a positive electrode active substance, an acetylene black as a conductive aid, and a polyvinylidene fluoride (PVdF) as a binder were mixed in a mass ratio of 89.5:4.5:6.0. N-methyl-2-pyrrolidone was further mixed in the obtained mixture to prepare a slurry-like solution. The slurry-like solution was applied on an aluminum foil having a thickness of 20 μm and a width of 200 mm; and after the solvent was dried and removed, the resultant was rolled by a roll press, further vacuum dried at 150° C. for 10 hours, punched into a rectangular shape of 50 mm×30 mm to obtain a positive electrode (ε). The slurry-like solution was prepared by regulating the solvent amount so that the mixture after the vacuum drying in the obtained electrode had a weight basis for one surface of 24.8 g/cm$^2$±3%, a thickness for one surface of 82.6 μm±3%, a density of 3.0 g/cm$^3$±3%, and a coating width of 150 mm to the aluminum foil width of 200 mm.

<Fabrication of a Negative Electrode>

A graphite carbon powder (trade name, "MCMB25-28", Osaka Gas Chemical Co., Ltd.) as a negative electrode active substance, an acetylene black as a conductive aid, and a polyvinylidene fluoride (PVdF) as a binder were mixed in a mass ratio of 93.0:2.0:5.0. N-methyl-2-pyrrolidone was further mixed in the obtained mixture to prepare a slurry-like solution. The slurry-like solution was applied on a copper foil having a thickness of 14 μm and a width of 200 mm; and after the solvent was dried and removed, the resultant was rolled by a roll press, further vacuum dried at 150° C. for 10 hours, punched into 52 mm×32 mm to obtain a negative electrode (ζ). The slurry-like solution was prepared by regulating the solvent amount so that the mixture after the vacuum drying in the obtained electrode had a weight basis for one surface of 11.8 g/cm$^2$±3%, a thickness for one surface of 84.6 μM±3%, a density of 1.4 g/cm$^3$±3%, and a coating width of 150 mm to the copper foil width of 200 mm.

<Assembling of a Battery>

Two sheets of a laminate film (no drawing, the thickness: 120 μm, 68 mm×48 mm) obtained by laminating an aluminum layer and a resin layer were overlapped with the aluminum layers outside, and three sides thereof were sealed to fabricate a laminate cell armor. Then, as a separator, a polyethylene-made microporous membrane (the membrane thickness: 20 μm, 53 mm×33 mm) was prepared; and a laminate in which pluralities of the positive electrode (ε) and the negative electrode (ζ) fabricated as described above were alternately overlapped through the separator was arranged in the laminate cell armor. Then, the electrolyte solution (m)

heated at 75° C. was injected in the cell armor to immerse the laminate in the electrolyte solution. The injection of the electrolyte solution (m) was carried out by repeating the atmospheric pressure and the reduced pressure of 100 mmHg until there was no generation of bubbles. The remaining one side of the laminate cell armor was sealed under the environment of reduced pressure of 100 mmHg to obtain a lithium ion secondary battery. The obtained battery was held at 75° C. for 2.5 hours, and thereafter cooled to 25° C. to obtain a battery (m2).

Example 2-8

A battery (A3: a single layer laminate-type battery) was obtained as in Example 1-32, except for using the base electrolyte solution (A) in place of the electrolyte solution (m).

For the batteries (m2) and (A3) of Example 1-32 and Example 2-8, the test described in the above-mentioned "(x) Test of lithium deposition of a lithium ion secondary battery" was carried out. The results are shown in Table 9. The battery (m2) exhibited suppressed deposition and improved safety.

TABLE 9

| | | Example 1-32 | Example 2-8 |
|---|---|---|---|
| Battery | | (m2) | (A3) |
| Depositing state of lithium | | B | C |
| Discharge capacity | 45 mA | 44.6 | 46.4 |
| (mAh) | 135 mA | 28.4 | 28.4 |

For the batteries (m2) and (A3) of Example 1-32 and Example 2-8, the measurement described in the above-mentioned "(vi) Measurement of the discharge capacity of a laminate-type lithium ion secondary battery" was carried out. The results are shown in Table 9.

The properties of the gelatinous compositions were measured and evaluated as follows.

(xi) Evaluation of the Gelling Power

A gelling agent and a nonaqueous solvent (an ionic liquid may be used as one type thereof in some cases) were mixed under heating in a vessel to make a homogeneous mixed liquid, which was thereafter cooled to 25° C. to obtain a sample liquid. The heating was carried out until the gelling agent was dissolved, and the final temperature was in the range of 70° C. to 100° C. The vessel was allowed to stand at an environment of 25° C. for 30 min, and thereafter turned upside down in the state of the sample liquid accommodated therein, and the fluidity at this time was observed to evaluate the gelling power. A material which had lost fluidity was regarded as being gelatinized, and evaluated as "a gelatinous composition"; and by changing the mixing ratio of a nonaqueous solvent and a gelling agent, the lowest concentration of the gelling agent necessary for making a gelatinous composition (the concentration of the gelling agent based on the total amount of the gelatinous composition) was determined as a gelling concentration. A smaller amount of a gelling agent can be said to exhibit a higher gelling power. The results are shown in Tables 10 to 12 and 14. In Tables 10 to 12 and 14, "%" means % by mass.

(xii) Evaluation of Stability of a Gel

A sample liquid (the concentration of a gelling agent was the lowest one necessary for making a gelatinous composition) containing a nonaqueous solvent, prepared in "(xi) Evaluation of the gelling power", was allowed to stand at 25° C. for 3 days, visually judged for the gel state, and evaluated as follows. The observation of the fluidity was carried out by turning upside down the vessel accommodating the sample liquid and observing the fluidity at this time. The results are shown in Table 13.

A: a gel was stably present also after still standing.

B: a small amount of a nonaqueous solvent oozed out from the gel after still standing.

C: the fluidity was redeveloped, or a gelling agent and a nonaqueous solvent were phase-separated, after still standing.

(xiii) Lithium Deposition Test of a Lithium Ion Secondary Battery

A lithium deposition test was carried out using a fabricated lithium ion battery being a monolayer laminate type battery equipped with electrodes, described later. The battery charged to 4.2 V at a constant current of 9.0 mA was discharged to 3.0 V, and further charged at a constant current of 45 mA for 1.5 hours. The charged battery was disassembled in an atmosphere of a dew point of −60° C. or lower and a moisture concentration of 10 ppm or less. The negative electrode surface of the disassembled battery was observed by an optical microscope of a magnification of 2,000× to evaluate the behavior of lithium deposition based on the following standard.

A: there was recognized no lithium deposition.

B: there was recognized lithium deposition, but the surface of the deposit was smooth.

C: there was recognized lithium deposition, and sharp dendrite was recognized on the surface of the deposit.

The deposition of dendrite causes battery short circuit, and causes a decrease in the safety of the battery.

(xiv) Test of the Carbon Dioxide Absorption Capacity

The carbon dioxide absorption capacity was tested at each carbon dioxide pressure by a weight method using a magnetic levitation-type balance (trade name: "MSB-AD", made by BEL Japan, Inc.). The carbon dioxide absorption capacity was evaluated as a carbon dioxide absorption capacity per unit weight of a sample in terms of an amount of carbon dioxide at 25° C. and 1 atm.

Examples 1-33 to 1-40, and Examples 2-9 to 2-11

The compound (10) and the compounds (12) to (20) were evaluated for the gelling power by adding any one of the nonaqueous solvents shown in Tables 10 to 12. The results are shown in Tables 10 to 12.

The compound (10) and the compounds (13) to (20) were evaluated for the gel stability by adding any one of the nonaqueous solvents shown in Table 13. The results are shown in Table 13.

Examples 1-41 to 1-43

The compound (12), the compound (14) and the compound (21) were evaluated for the gelling power by adding any one of the ionic liquids shown in Table 14. The results are shown in Tables 14.

[Formula 14]

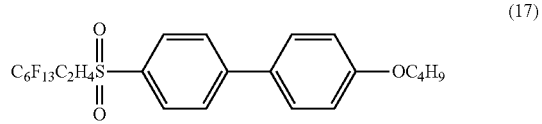

(17)

-continued

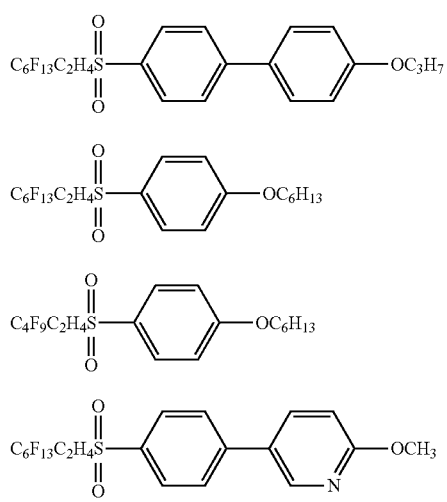

The compound (17) and the compound (18) were synthesized according to the synthesis method of the compound (14). With respect to these compounds also, the structures were identified by $^1$H-NMR (CDCl$_3$) and $^{19}$F-NMR (CDCl$_3$) as described above. The results were as follows.

[Compound (17)]

$^1$H-NMR (CDCl$_3$) 0.91 (3H, m), 1.42 (2H, m), 1.81 (2H, m), 2.65 (2H, m), 3.35 (2H, m), 4.03 (2H, m), 7.01 (2H, d, J=8.0 Hz), 7.57 (2H, d, J=8.0 Hz), 7.78 (2H, d, J=8.0 Hz), 7.97 (2H, d, J=8.0 Hz) ppm $^{19}$F-NMR (CDCl$_3$) −126.62 (2F, m), −123.60 (2F, m), −123.34 (2F, m), −122.37 (2F, m), −114.02 (2F, m), −81.25 (3F, m) ppm

[Compound (18)]

$^1$H-NMR (CDCl$_3$) 0.90 (3H, m), 1.82 (2H, m), 2.65 (2H, m), 3.34 (2H, m), 4.02 (2H, m), 7.00 (2H, d, J=8.0 Hz), 7.56 (2H, d, J=8.0 Hz), 7.76 (2H, d, J=8.0 Hz), 7.96 (2H, d, J=8.0 Hz) ppm $^{19}$F-NMR (CDCl$_3$) −126.62 (2F, m), −123.60 (2F, m), −123.34 (2F, m), −122.36 (2F, m), −114.02 (2F, m), −81.25 (3F, m) ppm The compound (19) and the compound (20) were synthesized according to the synthesis methods described in WO 2009/78268. With respect to the compound (19) and the compound (20) also, the structures were identified by $^1$H-NMR (CDCl$_3$) and $^{19}$F-NMR (CDCl$_3$). The results were as follows.

[Compound (19)]

$^1$H-NMR (CDCl$_3$) 0.91 (3H, m), 1.36 (6H, m), 1.82 (2H, m), 2.57 (2H, m), 3.29 (2H, m), 4.04 (2H, m), 7.04 (2H, d, J=8.0 Hz), 7.83 (2H, d, J=8.0 Hz) ppm $^{19}$F-NMR (CDCl$_3$) −126.59 (2F, m), −123.61 (2F, m), −123.32 (2F, m), −122.35 (2F, m), −114.00 (2F, m), −81.26 (3F, m) ppm

[Compound (20)]

$^1$H-NMR (CDCl$_3$) 0.91 (3H, m), 1.35 (6H, m), 1.81 (2H, m), 2.57 (2H, m), 3.29 (2H, m), 4.04 (2H, m), 7.03 (2H, d, J=12.0 Hz), 7.83 (2H, d, J=8.0 Hz) ppm $^{19}$F-NMR (CDCl$_3$) −126.49 (2F, m), −124.59 (2F, m), −114.24 (2F, m), −81.48 (3F, m) ppm The compound (21) was synthesized according to the following scheme. Specifically, 1.21 g (0.0021 mol, the compound (b)) of 1-bromo-4-[(3,3,4,4,5,5,6,6,7,7,8,8,8-tridecafluorooctyl)sulfonyl]benzene, 0.5 g (0.0021 mol) of 2-methoxy-5-(4,4,5,5-tetramethyl-1,3,2-dioxaborolan-2-yl)pyridine, 40 mL of a 2M sodium carbonate aqueous solution, and 40 mL of 1,4-dioxane were added to a 100-mL round-bottomed flask in a nitrogen atmosphere. Triphenylphosphine (0.34 g, 0.0013 mol) and palladium acetate (0.0754 g, 0.00034 mol) were further added thereto, and the mixture was vigorously stirred at 95° C. for 2.5 hours. After the flask atmosphere was returned to the air atmosphere, 50 mL of water was added thereto at room temperature, and stirred for 30 min to cool the interior.

After the completion of the reaction, a solid was observed in the flask, and ethyl acetate was added to dissolve the solid. The content was transferred to a separating funnel; after a water phase was removed, an organic phase was washed three times with 1M hydrochloric acid, and washed once with water and with brine each. Magnesium sulfate was added thereto to dry the organic phase, and magnesium sulfate was removed by filtration. A filtrate was concentrated by an evaporator, and purified by silica gel column chromatography; and the recrystallization was carried out with ethanol to obtain 0.64 g of a solid (yield: 51%).

[Formula 15]

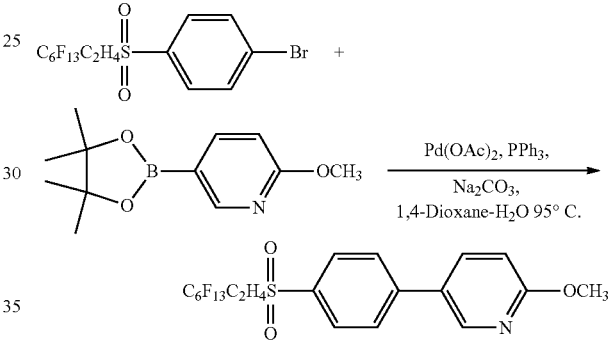

The structure of the obtained compound (21) was identified by IR (KBr) and $^1$H-NMR (CDCl$_3$). The results were as follows.

IR (KBr) ν=1138.0, 1151.5, 1197.8, 1209.4, 1234.4, 1294.2, 1485.2, 1606.7 cm$^{-1}$ $^1$H-NMR (CDCl$_3$) 2.24 (2H, m), 3.36 (2H, m), 4.01 (3H, s), 6.88 (1H, d, J=8.5 Hz), 7.76 (2H, d, J=8.5 Hz), 7.83 (1H, dd, J=8.5 Hz, 2.5 Hz), 8.00 (2H, d, J=8.5 Hz), 8.45 (1H, d, J=2.5 Hz) ppm

TABLE 10

| | | Example 1-33 |
|---|---|---|
| | Gelling agent type | (12) |
| Nonaqueous solvent | Ethanol | 5% |
| | Propylene carbonate | 0.8% |
| | γ-butyrolactone | 1.0% |

TABLE 11

| | | Example 1-34 |
|---|---|---|
| | Gelling agent type | (14) |
| Nonaqueous solvent | Ethyl methyl carbonate | 0.8% |
| | Propylene carbonate | 0.5% |
| | γ-butyrolactone | 0.5% |
| | Acetonitrile | 0.5% |
| | N-methylpyrrolidone | 0.5% |
| | 3-pentanone | 0.5% |
| | N,N-dimethylacetamide | 0.6% |
| | Ethyl acetate | 0.6% |

TABLE 11-continued

|  | Example 1-34 |
|---|---|
| 1,4-dioxane | 0.5% |
| Tetrahydrofuran | 0.5% |
| Ethanol | 1.0% |

TABLE 12

| | | Ex. 1-35 | Ex. 1-36 | Ex. 1-37 | Ex. 1-38 | Ex. 1-39 | Ex. 1-40 | Example 2-9 | Ex. 2-10 | Example 2-11 |
|---|---|---|---|---|---|---|---|---|---|---|
| | | | | | | Gelling agent type | | | | |
| | | (14) | (13) | (17) | (18) | (15) | (16) | (19) | (10) | (20) |
| Non-aqueous solvent | Ethanol | 1% | 1% | 1% | 1.5% | 3% | 1% | 5% | 3% | 5% |
| | Acetonitrile | 0.5% | 1% | 1% | 1% | 1% | 1% | Not gelatinized | 3% | Not gelatinized |
| | γ-butyrolactone | 0.5% | 1% | 0.7% | 1% | 0.7% | 0.7% | 3% | 3% | Not gelatinized |
| | NMP | 0.5% | 0.5% | 0.5% | 1.5% | 1.0% | 1.0% | Not gelatinized | 3% | Not gelatinized |

TABLE 13

| | | Ex. 1-35 | Ex. 1-36 | Ex. 1-37 | Ex. 1-38 | Ex. 1-39 | Ex. 1-40 | Ex. 2-9 | Ex. 2-10 | Ex. 2-11 |
|---|---|---|---|---|---|---|---|---|---|---|
| | | | | | | Gelling agent type | | | | |
| | | (14) | (13) | (17) | (18) | (15) | (16) | (19) | (10) | (20) |
| Non-aqueous solvent | Ethanol | A | A | A | B | B | A | C | C | C |
| | Acetonitrile | A | A | A | A | A | A | C | A | C |
| | γ-butyrolactone | A | A | A | A | A | A | A | A | C |
| | NMP | A | A | A | A | A | A | C | A | C |

TABLE 14

| | Example 1-41 | Example 1-42 | Example 1-43 |
|---|---|---|---|
| Gelling agent type | (12) | (14) | (21) |
| Ionic liquid Bmim TFSI | 1.2% | 0.9% | 1.7% |
| Emim TFSI | 1.2% | 0.7% | 1.8% |
| P13 TFSI | 1.3% | 0.8% | 1.8% |
| TMPA TFSI | 1.9% | 1.0% | 1.7% |
| DEME TFSI | 1.3% | 0.9% | 1.6% |

Bmim TFSI = 1-butyl-3-methyl-imidazolium bis(trifluoromethanesulfonyl)imide
Emim TFSI = 1-ethyl-3-methyl-imidazolium bis(trifluoromethanesulfonyl)imide
P13 TFSI = N-methyl-N-propylpyrrolidinium ammonium bis(trifluoromethanesulfonyl)imide
TMPA TFSI = N,N,N-trimethyl-N-propylammonium bis(trifluoromethanesulfonyl)imide
DEME TFSI = N,N-diethyl-N-(2-methoxyethyl)ammonium bis(trifluoromethanesulfonyl)imide Example 1-44

Fabrication of a Positive Electrode for a Lithium Ion Battery

Lithium cobaltate ($LiCoO_2$) as a positive electrode active substance, acetylene black as an electroconductive aid, and a polyvinylidene fluoride (PVdF) as a binder were mixed in a mass ratio of 89.5:4.5:6.0. The obtained mixture was further mixed with N-methyl-2-pyrrolidone to prepare a slurry solution. The slurry solution was applied on an aluminum foil of 20 μm in thickness and 200 mm in width; after the solvent was dried and removed, the applied slurry was rolled by a roll press, and further vacuum-dried at 150° C. for 10 hours, and punched out into a rectangular shape of 50 mm×30 mm to obtain a positive electrode. The slurry solution was prepared while with respect to the mixture of the obtained electrode after the vacuum-drying, the solvent amount was regulated so that: the weight basis for one surface became 24.8 g/cm²±3%; the thickness for the one surface, 82.6 μm±3%; the density, 3.0 g/cm³±3%; and the coating width, 150 mm to the width of 200 mm of the aluminum foil.

<Fabrication of a Negative Electrode>

A graphite carbon powder (trade name: "MCMB25-28", made by Osaka Gas Chemical Co., Ltd.) as a negative electrode active substance, acetylene black as an electroconductive aid, and a polyvinylidene fluoride (PVdF) as a binder were mixed in a mass ratio of 93.0:2.0:5.0. The obtained mixture was further mixed with N-methyl-2-pyrrolidone to prepare a slurry solution. The slurry solution was applied on an aluminum foil of 14 μm in thickness and 200 mm in width; after the solvent was dried and removed, the applied slurry was rolled by a roll press, and further vacuum-dried at 150° C. for 10 hours, and punched out into 52 mm×32 mm to obtain a negative electrode. The slurry solution was prepared while with respect to the mixture of the obtained electrode after the vacuum-drying, the solvent amount was regulated so that: the weight basis for one surface became 11.8 g/cm²±3%; the thickness for the one surface, 84.6 μm±3%; the density, 1.4 g/cm³±3%; and the coating width, 150 mm to the width of 200 mm of the aluminum foil.

<Application of a Perfluorocarbon Derivative>

5 parts by mass of the compound (14) was mixed in 100 parts by mass of dimethyl carbonate, and dissolved therein at 85° C. to obtain a dimethyl carbonate solution (α). The solution (α) was applied on the positive electrode under heating so that the positive electrode active substance and the compound (14) became 4:1 in mass ratio. After the application, the dimethyl carbonate was distilled out by continuing heating from the rear surface of the electrode, to cast-coat the compound (14) on the positive electrode.

Similarly, the solution (α) was applied on the negative electrode with the solution (α) in a heated state so that the negative electrode substance and the compound (14) became 2:1 in mass ratio; and the dimethyl carbonate was distilled out by further continuing heating to cast-coat the compound (14) on the negative electrode.

<Assembling of a Battery>

Two sheets of laminate film (no drawing processing, thickness: 120 μm, 68 mm×48 mm) obtained by laminating an aluminum layer and a resin layer were overlapped with the aluminum layers outward, and three sides were sealed to fabricate a laminate cell outer package. Then, a polyethylene microporous membrane (membrane thickness: 20 μm, 53 mm×33 mm) as a separator was prepared; and a laminate obtained by stacking alternately the positive electrode and the negative electrode coated with the compound (14) as described above through the separator in plural numbers was arranged in the laminate cell outer package. Then, an electrolyte solution was injected in the cell outer package to immerse the laminate in the electrolyte solution. The electrolyte solution used was one in which 1M of $LiPF_6$ was dissolved in a mixed solution of ethylene carbonate and methyl ethyl carbonate of 1:2 in volume ratio. The injection of the electrolyte solution was carried out by repeating reducing the pressure to 100 mmHg and increasing the pressure to the atmospheric pressure until the bubble generation vanishes. Under a reduced pressure environment of 100 mmHg, the remaining one side of the laminate cell outer package was sealed to thereby obtain a lithium ion secondary battery.

For the obtained lithium ion secondary battery, "(xiii) Test of lithium deposition of a lithium ion secondary battery" was carried out. The result is shown in Table 15.

Examples 1-45 and 1-46, and Example 2-12

Batteries were assembled as in Example 1-44, except for altering the presence and absence of coating of the compound (14) on the each electrode, and "(xiii) Test of lithium deposition of a lithium ion secondary battery" was carried out. The evaluation results are shown in Table 15.

TABLE 15

| | | Example 1-44 | Example 1-45 | Example 1-46 | Example 2-12 |
|---|---|---|---|---|---|
| Coating of compound (14) | Positive electrode | present | present | absent | absent |
| | Negative electrode | present | absent | present | absent |
| | Deposition | B | B | B | C |

Example 1-47

5.3 parts by mass of the compound (21) was added to 100 parts by mass of P13 TFSI being an ionic liquid, and heated to 80° C. to dissolve the mixture; and the solution was cooled to room temperature to prepare an evaluation sample. The sample was subjected to "(xiv) Test of the carbon dioxide absorption capacity". The evaluation result is shown in Table 16.

TABLE 16

Example 1-47

| Pressure of carbon dioxide (MPaG) | Absorbed amount of carbon dioxide (mL/g) |
|---|---|
| 0.2 | 3.5 |
| 0.4 | 6.9 |

TABLE 16-continued

Example 1-47

| Pressure of carbon dioxide (MPaG) | Absorbed amount of carbon dioxide (mL/g) |
|---|---|
| 0.6 | 10.5 |
| 0.8 | 13.8 |

INDUSTRIAL APPLICABILITY

The lithium ion secondary battery according to the present invention is expected to be utilized, for example, for portable devices such as cell phones, mobile audios and personal computers, and additionally, rechargeable batteries for automobiles such as hybrid cars, plug-in hybrid cars and electric powered cars. The fluoroalkane derivative, the gelling agent and the gelatinous composition according to the present invention can be used to solidify liquid substances in various types of industrial fields (for example, coating, cosmetic, pharmaceutical and medical, spilled petroleum-treating, electronic and optical, and environmental fields).

REFERENCE SIGNS LIST

100 . . . Lithium ion secondary battery, 110 . . . Separator, 120 . . . Positive electrode, 130 . . . Negative electrode, 140 . . . Positive electrode current collector, 150 . . . Negative electrode current collector, 160 . . . Battery armor.

The invention claimed is:

1. An electrolyte solution for a lithium ion secondary battery, comprising a nonaqueous solvent, a lithium salt and a compound represented by the following general formula (Z):

wherein $Ar^1$ denotes a substituted or nonsubstituted divalent aromatic group having 5 to 30 atoms of the nucleus(es); $R^1$ denotes a saturated or unsaturated monovalent hydrocarbon group having 1 to 20 carbon atoms; and R denotes a saturated or unsaturated monovalent hydrocarbon group having a perfluoroalkyl group and having 2 to 22 carbon atoms.

2. The electrolyte solution for a lithium ion secondary battery according to claim 1, wherein the compound is a compound represented by the following general formula (1):

[Formula 1]

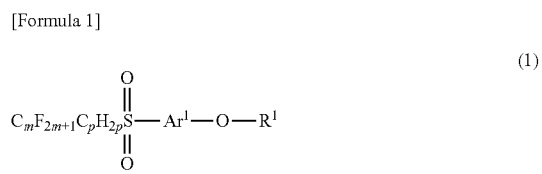

wherein $Ar^1$ denotes a substituted or nonsubstituted divalent aromatic group having 5 to 30 atoms of the nucleus(es); $R^1$ denotes a saturated or unsaturated monovalent hydrocarbon group having 1 to 20 carbon atoms; and m denotes a natural number of 2 to 16, and p denotes an integer of 0 to 6.

3. The electrolyte solution for a lithium ion secondary battery according to claim 1, wherein the $Ar^1$ is a substituted or nonsubstituted divalent aromatic group having 8 to 20 atoms of the nucleus(es).

4. The electrolyte solution for a lithium ion secondary battery according to claim 1, wherein the $Ar^1$ is a group selected from the group consisting of a biphenylene group, a naphthylene group, a terphenylene group and an anthranylene group.

5. The electrolyte solution for a lithium ion secondary battery according to claim 1, wherein the nonaqueous solvent is a mixed solvent of two or more solvents.

6. The electrolyte solution for a lithium ion secondary battery according to claim 1, wherein the electrolyte solution is a gelatinized electrolyte solution.

7. A lithium ion secondary battery comprising:
an electrolyte solution for a lithium ion secondary battery according to claim 1;
a positive electrode comprising one or more materials selected from the group consisting of materials capable of doping and dedoping lithium ions, as a positive electrode active substance; and
a negative electrode comprising one or more materials selected from the group consisting of materials capable of doping and dedoping lithium ions and metallic lithium, as a negative electrode active substance.

8. The lithium ion secondary battery according to claim 7, wherein the positive electrode comprises a lithium-containing compound as the positive electrode active substance.

9. The lithium ion secondary battery according to claim 8, wherein the lithium-containing compound comprises one or more compounds selected from the group consisting of metal oxides containing lithium and metal chalcogenides containing lithium.

10. The lithium ion secondary battery according to claim 7, wherein the negative electrode comprises one or more materials selected from the group consisting of metallic lithium, carbon materials, and materials containing an element capable of forming an alloy with lithium, as the negative electrode active substance.

11. A fluoroalkane derivative represented by the following general formula (Z):

$$R\text{—}SO_2\text{—}Ar^1\text{—}O\text{—}R^1 \quad (Z)$$

wherein $Ar^1$ denotes a substituted or nonsubstituted divalent aromatic group having 5 to 30 atoms of the nucleus(es); $R^1$ denotes a saturated or unsaturated monovalent hydrocarbon group having 1 to 20 carbon atoms; and R denotes a saturated or unsaturated monovalent hydrocarbon group having a perfluoroalkyl group and having 2 to 22 carbon atoms.

12. The fluoroalkane derivative according to claim 11, being represented by the following general formula (1):

[Formula 2]

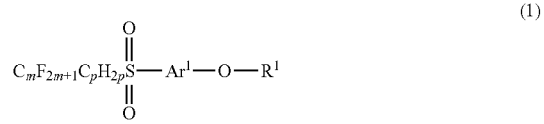

wherein $Ar^1$ denotes a substituted or nonsubstituted divalent aromatic group having 5 to 30 atoms of the nucleus(es); $R^1$ denotes a saturated or unsaturated monovalent hydrocarbon group having 1 to 20 carbon atoms; and m denotes a natural number of 2 to 16, and p denotes an integer of 0 to 6.

13. The fluoroalkane derivative according to claim 11, wherein the $Ar^1$ is a substituted or nonsubstituted divalent aromatic group having 8 to 20 atoms of the nucleus(es).

14. The fluoroalkane derivative according to claim 11, wherein the $Ar^1$ is a condensed ring having one or more aromatic hydrocarbon rings, or a group having a plurality of aromatic rings connected by a single bond(s), one or more of the aromatic rings being an aromatic hydrocarbon ring.

15. The fluoroalkane derivative according to claim 11, wherein the $Ar^1$ is a group selected from the group consisting of a biphenylene group, a naphthylene group, a terphenylene group and an anthranylene group.

16. A gelling agent comprising a fluoroalkane derivative according to claim 11.

17. The gelling agent according to claim 16, wherein the $Ar^1$ is a substituted or nonsubstituted divalent aromatic group having 8 to 20 atoms of the nucleus(es).

18. The gelling agent according to claim 16, wherein the $Ar^1$ is a group selected from the group consisting of a biphenylene group, a naphthylene group, a terphenylene group and an anthranylene group.

19. A gelatinous composition comprising a gelling agent according to claim 16, and a nonaqueous solvent.

20. An electrode for an electrochemical device, comprising a gelling agent according to claim 16.

21. An electrolyte solution for a dye-sensitized solar battery, comprising a gelling agent according to claim 16.

22. A carbon dioxide-absorbing composition comprising a gelling agent according to claim 16, and an ionic liquid.

* * * * *